United States Patent
Atkinson et al.

(10) Patent No.: US 9,322,641 B2
(45) Date of Patent: *Apr. 26, 2016

(54) LOCATING AND RELOCATING DEVICE

(71) Applicant: ATKINSON AUDIO INC., Toronto (CA)

(72) Inventors: Darren Glen Atkinson, Toronto (CA); Keith Louis Haughton, Toronto (CA)

(73) Assignee: ATKINSON AUDIO INC., Toronto, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/365,970

(22) PCT Filed: Dec. 14, 2012

(86) PCT No.: PCT/CA2012/050898
§ 371 (c)(1),
(2) Date: Jun. 16, 2014

(87) PCT Pub. No.: WO2013/086635
PCT Pub. Date: Jun. 20, 2013

(65) Prior Publication Data
US 2014/0363030 A1     Dec. 11, 2014

Related U.S. Application Data

(63) Continuation-in-part of application No. 13/327,540, filed on Dec. 15, 2011, now Pat. No. 8,991,062.

(51) Int. Cl.
*G01B 11/14*     (2006.01)
*G01B 11/26*     (2006.01)
(Continued)

(52) U.S. Cl.
CPC ............. *G01B 11/14* (2013.01); *G01B 11/002* (2013.01); *G01B 11/26* (2013.01); *G01C 15/02* (2013.01); *H04R 1/08* (2013.01); *Y10S 33/21* (2013.01)

(58) Field of Classification Search
CPC ........... F41G 1/34; F41G 1/467; G01C 15/00; G01C 15/02; G01B 11/00; G01B 11/14; G01B 11/26
USPC ..................... 33/263, 286, DIG. 21
See application file for complete search history.

(56) References Cited

U.S. PATENT DOCUMENTS 3,489,495 A     1/1970    Blau et al.
4,621,926 A    11/1986    Merry et al.
(Continued)

FOREIGN PATENT DOCUMENTS

AU     2488688 B     4/1989
DE     10242749      4/2004
(Continued)

OTHER PUBLICATIONS

International search report for PCT application No. PCT/CA2012/050989, mailed May 14, 2013.

*Primary Examiner* — Yaritza Guadalupe-McCall
(74) *Attorney, Agent, or Firm* — Hill & Schumacher

(57) ABSTRACT

A relocating device for locating and relocating a first object relative to a second object includes at least one light source, and a power source. The at least one light source is for producing at least two beams of light wherein each beam of light is capable of defining a beam location point on the second object. The at least one light source is operably connected to the first object. The power source is operably connected to the at least one light source. The relocating device also includes a means for defining the beam location point. A method of locating and relocating a first object relative to a second object is also disclosed.

17 Claims, 26 Drawing Sheets

(51) Int. Cl.
*G01C 15/02* (2006.01)
*G01B 11/00* (2006.01)
*H04R 1/08* (2006.01)

(56) References Cited

U.S. PATENT DOCUMENTS

| | | | |
|---|---|---|---|
| 4,691,446 A | 9/1987 | Pitches et al. |
| 4,709,580 A | 12/1987 | Butts, Jr. et al. |
| 4,813,774 A | 3/1989 | Dorschner et al. |
| 5,046,259 A | 9/1991 | Tusting |
| 5,767,960 A | 6/1998 | Orman |
| 6,087,645 A | 7/2000 | Kitajima et al. |
| 6,301,997 B1 | 10/2001 | Welte |
| 6,417,839 B1 | 7/2002 | Odell |
| 6,891,148 B1 | 5/2005 | Rivera et al. |
| 7,003,890 B2 | 2/2006 | Kavounas |
| 7,200,946 B2 | 4/2007 | Ritenour |
| 7,219,437 B2 | 5/2007 | Dallman |
| 7,219,438 B2 | 5/2007 | Amron et al. |
| 7,525,670 B1 | 4/2009 | Burkatovsky |
| 7,614,154 B2 | 11/2009 | Cobb |
| 7,621,053 B2 | 11/2009 | Bianchin |
| 7,908,750 B2 | 3/2011 | Goick |
| 7,984,557 B1 | 7/2011 | Carl |
| 8,087,176 B1 | 1/2012 | Hayes et al. |
| 8,104,186 B2 | 1/2012 | Raschella et al. |
| 8,220,167 B2 | 7/2012 | Swanson et al. |
| 8,281,495 B2 | 10/2012 | Hayes et al. |
| 8,595,946 B2 | 12/2013 | Hayes et al. |
| 8,991,062 B2 * | 3/2015 | Atkinson et al. | 33/286 |
| 2004/0200082 A1 | 10/2004 | Dinicola |
| 2006/0283029 A1 | 12/2006 | Jan et al. |
| 2009/0241357 A1 | 10/2009 | Raschella et al. |
| 2013/0097880 A1 | 4/2013 | Wernig et al. |
| 2013/0155419 A1 * | 6/2013 | Atkinson et al. | 356/616 |
| 2013/0263459 A1 | 10/2013 | Rabiner et al. |
| 2013/0326892 A1 | 12/2013 | Schorr |
| 2014/0363030 A1 * | 12/2014 | Atkinson et al. | 33/227 |

FOREIGN PATENT DOCUMENTS

| | | |
|---|---|---|
| FR | 2764992 | 12/1998 |
| JP | 2001-12921 | 1/2001 |
| WO | 9960335 A1 | 11/1999 |

* cited by examiner

LOCATING AND RELOCATING DEVICE

FIELD OF THE DISCLOSURE

This disclosure relates to a device for locating and relocating a first object relative to a second object.

BACKGROUND

The locating and relocating of objects relative to each other can be frustrating and time consuming. This is particularly true when one object needs to be relocated relative to the other object in substantially the same place. One can imagine that this is particularly true with regard to a photo shoot so that the lights, camera and subject can be relocated relative to each other so that the photo can be reproduced. Similarly with precision machinery when one machine is moved for maintenance for example it is important that it can be relocated in the same location relative to the other machines so that the machines will work together in the same way.

The challenge of relocating one object relative to the other is particularly problematic in the music industry. The location of the instruments relative to each other and the location of the microphones relative to the instruments can affect the sound produced. The position of everything in the room can affect the sound. Accordingly it is very important to be able to relocate all objects relative to each other when a desired sound is achieved. It will be appreciated that from one song to another the most desirable sound might change and thus the location of the objects might need to be changed. Further, the cost of renting a recording studio can be considerable therefore if one can locate the instruments and equipment quickly and efficiently one can make more productive use of one's recording time. Currently, in the music industry if a band can afford it they will rent the recording studio for an extended period of time and not move the equipment or objects until the album is finished. Clearly this is a very costly solution. Alternatively they will "eye ball" the equipment into the same positions and then either make do or take a considerable amount of time to then adjust the equipment until it sounds essentially the same.

Accordingly it would be desirable to provide a device and method of locating and relocating a first object relative to a second object.

SUMMARY

A relocating device for locating and relocating a first object relative to a second object includes at least one light source, and a power source. The at least one light source is for producing at least two beams of light wherein each beam of light is capable of defining a beam location point on the second object. The at least one light source is operably connected to the first object. The power source is operably connected to the at least one light source. The relocating device also includes a means for defining the beam location point.

The light source may be a laser beam.

The light source may be two light sources defining two beams of light and defining two beam location points.

The light source may be three light sources defining three beams of light and defining three beam location points.

The beam location points may define an address.

The relocating device may be adapted to be used in association with a means for defining a location point on the second object which is used to define the beam location point in relation to the second object. The means for defining a beam location point on the second object may be one of a marker, an adhesive locator, an adhesive locator with an alignment symbol thereon and an adhesive locator with an alignment symbol and a bar code.

The at least one light source may be a plurality of light sources, each light source being a laser beam and each laser beam defining a beam location point.

Each laser beam may be a laser measuring device that measures the distance from the first object to the second object and thus defines the beam location point on the second object.

The distance measurements may define an address and the address may be used to define the beam location points in relation to the second object.

The relocating device may further include a means for defining a yaw of the relocating device and the yaw is further used to define an address. The means for defining the yaw may be a compass.

The relocating device may further include a means for defining the pitch and roll of the relocating device and the pitch and roll are further used to define an address. The means for defining the pitch and roll may be a gyroscope.

The relocating device may be a tetrahedral shape having four faces and each beam of light emanates from a different face. The tetrahedral shape may be an irregular tetrahedral shape and each beam may emanate normally from the different face.

The relocating device may have a plurality of faces and each beam of light emanates from a different face.

The light source may be a plurality of light sources each light source defining a light beam and each light beam defining a beam location point.

The relocating device may be releasably attachable to the first object. Alternatively, the relocating device may be integrally attached to the first object.

The relocating device may further include a mount and the mount may be attached to the first object and the relocating device may be releasably attached to the mount. The mount may have a plurality of mounting positions. The mount may include an adhesive strip for attaching the mount to the first object. The adhesive strip may be a double sided adhesive strip.

Each beam has a direction and the direction of each beam may be adjustable and the direction of the beam may be relocatable relative to the first object. Each beam may be adjusted so that the beam location point is a predetermined point on the second object. The direction of each beam may be lockable.

Each beam may have direction and the direction of each beam is fixed relative to the relocating device.

The first object may be a microphone and the relocating device is integrally attached to the microphone.

The first object may be a microphone and the microphone may be releasably attached to a clip and the relocating device is integrally attached to the clip. The clip may be attached to a microphone stand.

The first object may be a microphone and further including a mount and the mount may be attached to microphone and the relocating device is releasably attached to the mount. The mount may include an adhesive strip for attaching the mount to the microphone.

The first object may be a camera, a piece of machinery, a light, a musical instrument, an amplifier, a microphone or a stand. The second object may be a room, wall, a ceiling, a piece of machinery, a musical instrument, an amplifier and piece of art. The first object may be a microphone and the second object may be a drum. The first object may be a microphone and the second object may be an amplifier and loud speaker combination unit.

The defined relocation points may be only visible under ultraviolet light. The means for defining a location point may be logging information specific to the second object that corresponds to each location point.

The power source may be a battery.

Each beam may define an image. The image may be a dot or a grid pattern. The image may be a logo.

The light source may be a plurality of light sources defining a plurality of beams of light with each beam of light being a different colour.

The relocating device may be arranged such that the at least two beams of light are emitted from one end of the relocating device and further including at least two beams of light being emitted from the other end of the relocating device and wherein the beams of one end of the relocating device are used to position the first object and the beams of light from the other end are used to position the second object.

The relocating device may be arranged such that the at least two beams of light from one end of the relocating device are a plurality of beams of light and the at least two beams of light from the other end of the relocating device are a plurality of beams of light.

Data relating to each beam location point may be stored in a storage device in one of the relocating device, an external storage device or both. Further data such as date, song, group, recording session, instruments, amplifiers, microphones and a combination thereof may also be stored.

A method of locating and relocating a first object relative to a second object comprising the steps of: locating a first object relative to a second object to define a set location, the first object being positioned relative to a relocating device, the relocating device having at least one light source for producing at least two beams of light wherein each beam of light is capable of defining a beam location point in relation to the second object, a power source operably connected to the at least one light source, and a means for defining a beam location point; defining the location points relative to the second object with respect to each beam location point; moving at least one of the first object and the second object; and moving one of the first object relative to the second object so that each beam location point is in registration with the beam location point.

The relocating device may be operably attached to the first object.

The relocating device may be arranged such that at least two beams of light are emitted from one end of the relocating device and further including at least two beams of light being emitted from the other end of the relocating device and wherein the beams of one end of the relocating device are used to position the first object and the beams of light from the other end are used to position the second object.

The method may further include the step of releasably attaching the relocating device to the first object.

The method may further include the steps of attaching the first object to a mount and releasably attaching the relocating device to the mount.

The method may further include the step of locating the location points on the second object with respect to each beam location point at predetermined locations.

The method may further include the step of locking the direction of each beam.

The means for defining a location point may be logging information specific to the second object that corresponds to each location point and the method may further including the step of logging the information specific to the second object that corresponds to each location point.

Data relating to each beam location point may be stored in a storage device in one of the relocating device, an external storage device or both and the method may further include the step of logging the data. Further data may also stored such as date, song, group, recording session, instruments, amplifiers, microphones and a combination thereof.

Further features of the relocating device will be described or will become apparent in the course of the following detailed description.

BRIEF DESCRIPTION OF THE DRAWINGS

The relocating device will now be described by way of example only, with reference to the accompanying drawings, in which.

DETAILED DESCRIPTION

Figure 1:
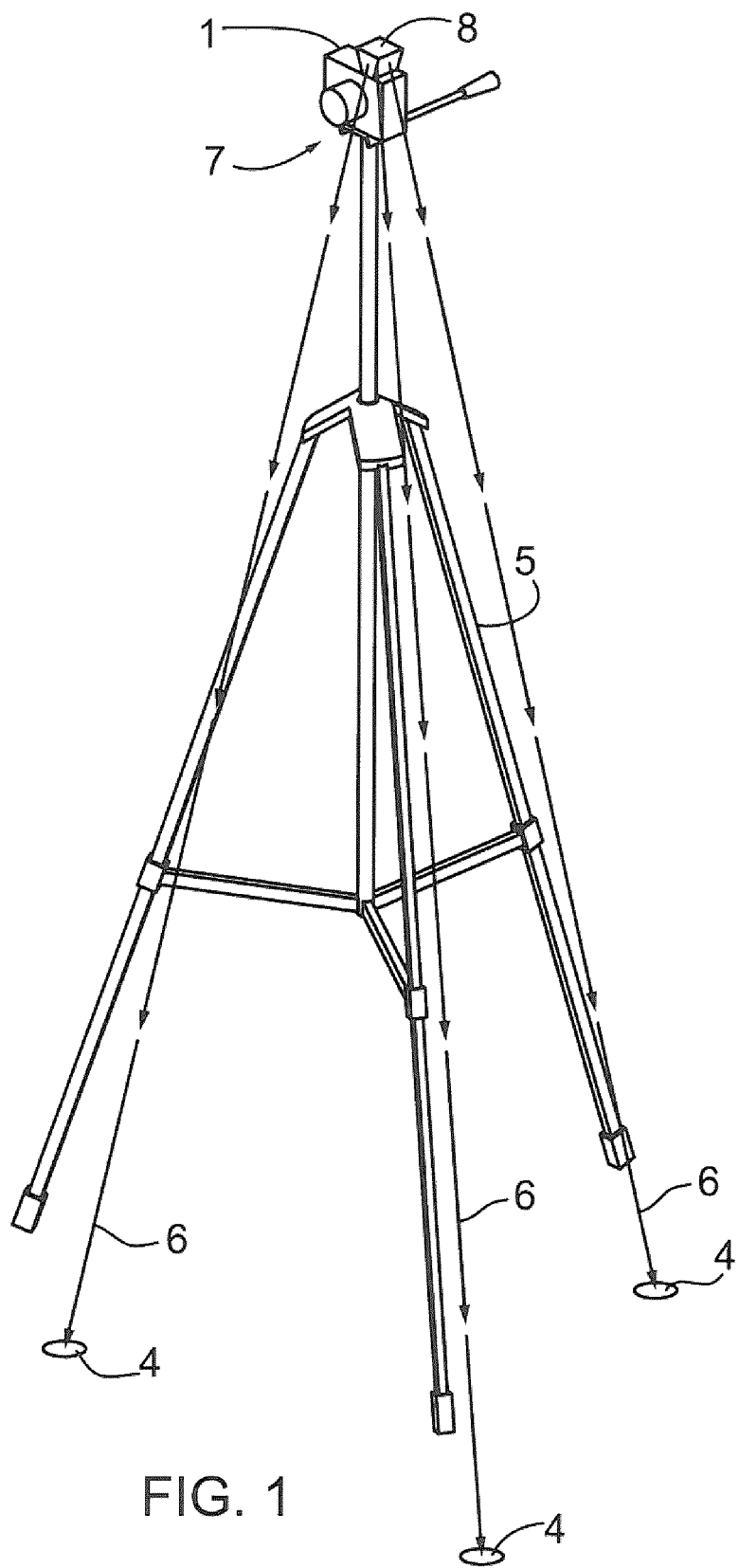
FIG. 1 is a perspective view of an embodiment of the relocating device attached to a camera.

The relocating device disclosed herein provides a means of effectively and efficiently meeting the needs of individuals in a multitude of industrial, commercial and domestic settings as well as artists, engineers, graphic designers and photographers in the photography and the sound industries by assisting them in the placement of their microphones, cameras, lighting fixtures, speakers, instruments and equipment. The relocating device assists the individuals by first allowing them to assign addresses to the location of their objects and equipment, then allowing them to move their objects and equipment with the confidence that it may be reconstructed or relocated in the same preferred configuration at a later time. The relocating device is for use in association with a means for defining a location point.

For the initial phase of the method of locating objects, the objects and equipment will be deemed to be in the right configuration and the relative placement of each piece of equipment will be established relative to other pieces of equipment and to the three dimensional environment the equipment is set up in. This is achieved by applying a relocating device which may be a laser module to the first object that has been placed, by energizing the beams of light and defining location points, by applying locators to the places where the cast beams of light terminate on a second object and labeling the locators with their roles. Alternatively the relocating device which may be positioned relative to the first object as well by having a relocating device wherein the beams of light are emitted from both ends thereof and by energizing the beams of light and defining location points on both objects, by applying locators to the places where the cast beams of light terminate on a both objects and labeling the locators with their roles. The plurality of location points on a second object that are associated with the relocating device that is operably connected to the first object are the address of the first object relative to the second object. This process is repeated for each object and piece of equipment that contributes to the generation of the setup that the individual is seeking. When all necessary objects and pieces of equipment that have been placed have been assigned an address in this manner, the configuration may, depending on circumstances, be used as it sits, changed into a new or different configuration or taken apart. This initial phase, where the addresses of the objects are established with respect to the three dimensional environment surrounding the objects, is analogous to the construction of a fixture or jig, that may be used to reconstruct the same spatial set up any time in the future. Since there are no real parts to this jig, it may be considered a virtual jig.

The above description of the initial phase is particularly suited for use of relocating devices that have fixed beams of light, where the direction each beam of light projects is fixed with respect to the relocating device itself and where locators are applied accordingly in the surrounding environment. In the case where each beam of light is adjustable in the direction it projects, with respect to the relocating device itself, an alternative initial phase of the method of locating objects is disclosed. For starters, same as above, the objects and equipment will be deemed to be in the right configuration, but in this case the relocating device is applied to a surface in the surrounding environment and, since the beams of light are adjustable, they are trained on the object itself and the points on the surface of the object where the beams of light terminate are marked with the application of locators. In this case, the role and location of the locators, the placement of the relocating device and the settings, denoting the direction that each beam of light projected relative to the relocating device or module, are all logged in order to allow reference to those particular details when reconstructing the set up. This object placement method will work the best where the object to be placed is relatively large, such that the applied locators are fairly far apart on the surface of the object. If the object to be placed is too small, all beams of light cast onto the surface of the object will tend to converge at one place and certainty of the pitch, role and yaw of the placed object will tend to be lost.

For the secondary phase of the method of locating objects the objects and equipment may be placed in their earlier location relative to other pieces of equipment and to the surrounding environment by applying the relocating device to the object to be placed, by energizing the beams of light and by adjusting the placement of the object until each of the cast beams of light from the module terminate on the correct locator or are in registration with the location points, as dictated by the locator label or logged information. The logged information may be information specific to the second object that corresponds to each location point. For example it may be three specific corners of the second object. This procedure is repeated for each object and piece of equipment in the configuration, until the whole configuration of objects has been reconstructed as per the initial set up. This secondary phase, where the spatial arrangement of the objects is reconstructed to be the same as the initial set up is analogous to the use of the virtual jig.

Similarly, an alternative secondary phase of the method of locating objects is disclosed, where a relocating device employing adjustable beams of light is used. In this case, the objects and equipment may be placed in their earlier location relative to other pieces of equipment and to the surrounding environment by applying the relocating device to the same location in the surrounding environment, by adjusting the direction of each projected beam of light to be the same relative to the first object as during the initial phase, by energizing the beams of lights and by adjusting the placement of the object until each of the cast beams of light from the module terminate on the correct locator or are in registration with the location points, as dictated by the logged information relating to that set up.

For both the initial and secondary phases of the method of locating objects, the devices employed consist of beams of light, relocating devices, mounts and locators. By way of example, the beams of light used may be of the low watt type having an effective range of several hundred meters or less and the lights are themselves physically small, typically a few centimeters long and a few millimeters in diameter. Generally, a relocating device would consist of one or more beams of light, a switch and a battery all built into a housing. If the relocating device is integral with an object, the housing of the relocating device may be a portion of the object itself and a power source other than a battery may be used. For a relocating device releasably attachable to an object, the means of releasable attachment may be mechanical, magnetic, adhesive or any number of other suitable methods. For a relocating device that is intended to be used with a mount, the means of releasable attachment of the module to the mount would ensure that the module attaches firmly and securely, but is easily separated from the mount when the time comes.

Preferably the placement and orientation of the releasably attachable relocating device to the object is limited to not more than a few places in order to assure that the relocating device be applied to the object the same way the secondary time as the initial time. In the embodiment where the relocating device is releasably attachable to a mount, the mount itself may be either releasably attachable to the object, one-time fixable to the object or integral with the object. The mount will have an aspect that allows it to be attached to an object and a second aspect that allows the relocating device to be releasably attachable to the mount. The main role of the mount is to allow a single relocating device to be employed with a wide variety of objects by standardizing the means of releasable attachment of the relocating device across all the objects, by using several individual mounts. The mount is a simple and inexpensive unit. Further, there may be several mount types available such that the means of releasable attachment of the relocating device is common to all of the mount types, yet the means of attachment of the different mounts to a wide variety of objects may be many.

Shown in FIG. 1 are a camera 1 and tripod 5 being located with the devices and methods discussed herein. A relocating device 8, which has been adapted to fit on to the camera 1 at the standardized accessory mount of the camera 1, has its three cast beams of light 6 directed to cast dots onto the floor of the studio. With locators 4 applied to the floor at the points where the cast beams of light 6 project, the ability to relocate the camera 1 in the same place has been established. Alternatively, the relocating device 8 may be adapted to fit onto the standardized camera mount 7 of the tripod 5. In that case, the relocating device 8 could be attached to the tripod 5, so the tripod 5 may be located and the relocating device 8 removed and the camera 1 attached later.

In FIG. 1 it was a camera on a tripod that was located using the method discussed herein, if the object to be located had been a person, then either their seat, their microphone stand, their music stand, a mat or some other furnishing could be located using the relocating device and locators, then when the person is in place in their seat or before their microphone or music stand, then the person has been effectively located.

Figure 2A:
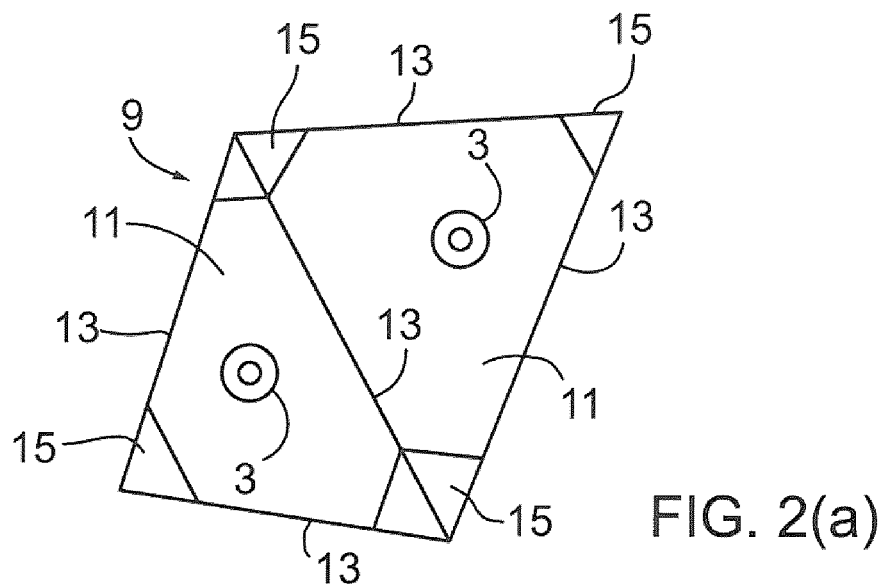
FIGS. 2 (a) and (b) are perspective views of a tetrahedral shaped embodiment of the relocating device with (a) showing two sides of the tetrahedral relocating device and (b) showing three sides of the tetrahedral relocating device.
Figure 2B:
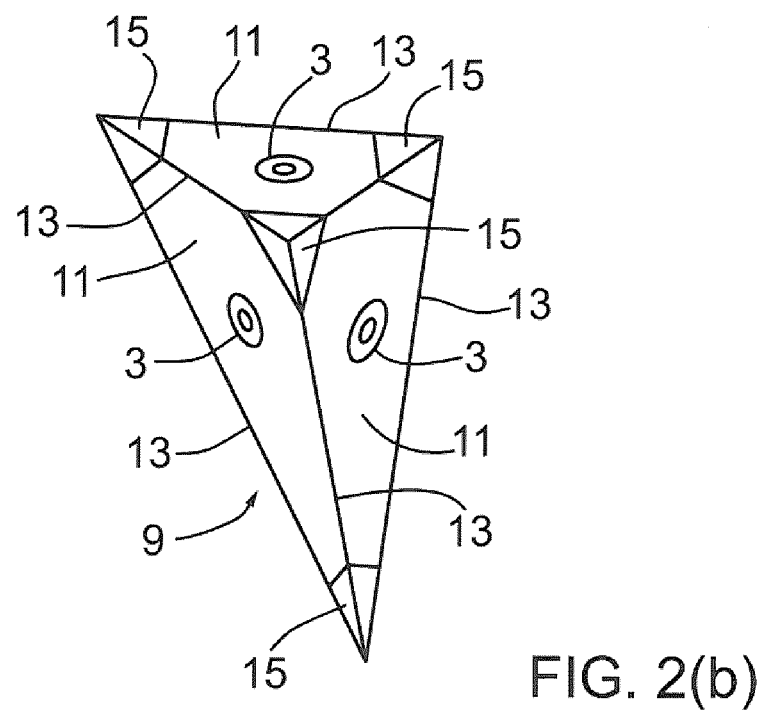

Shown in FIG. 2 is a tetrahedral shaped relocating device 9. This embodiment of the relocating device has four faces 11 and six edges 13. Each of the four faces 11 of the relocating device or module 9 has a light source 3 built into it. Thus a beam of light can emanate from each face 11 and the beam of light is preferably normal to the face 11. Each face 11 has a switch 15 that activates the light source 3. Alternatively one switch could activate all of the light sources. The light source may be a single light source that is split into multiple beams of light or there might be a separate light source built into it. The light sources may be beams of light. The lights may be laser beams such that when the beam intersects with a wall, floor, ceiling or other object a red dot is visible on the object. Alternatively the beams may be different colours. As shown, the device 9 is an irregular tetrahedron and has faces 11 that each have irregular triangle shapes so that each face 11 and edge 13 of the module 9 is unique. Each face 11 of the module 9 has been adapted with adhesive to allow the module 9 to be releasably attachable to any flat surface. The adhesive may be provided by means of tape with adhesive on both sides, such that one side is attachable to the module 9 and the other side allows for the releasable attachment of the module 9 to the surface of an object. As the tape is likely to lose its required adhesive properties after extended use, the tape could be replaced with a new piece of tape when required. Further, for the tape to allow removal of the module 9 from an object without substantially moving the object, it may be required that the adhesive properties on that side of the tape be closely controlled and that the size and shape of the tape closely match the size and shape of the face 11 of the module 9 that it is adapted to fit. Alternatively, the module 9 may be adapted to be releasably attachable by means of a magnet or other means. In operation, to initially locate an object, the module 9 would be applied to the surface of a first object and the light sources 3 would be energized to produce beams of light that define beam location points on the second objects. The locators would be applied to surfaces by the means for defining location points accordingly at the beam location points. If the three cast beams of light fall on surfaces that make the placement of locators on them unfavorable, the device or module 9 may be repositioned on the object until such a position is found that all three cast beams of light fall on favorable surfaces. When it has been established that the placement of the module 9 and the locators are acceptable, a line is drawn around the perimeter of the module 9 on the object. The module 9 would then be removed and the object would be satisfactorily located. The next time the object is to be located in the same place, the module 9 would be applied to the same place as the traced outline, the light sources 3 energized, the object located with respect to the applied locators 4, and the module 9 would then be removed. The fact that the tetrahedral relocating device 9 has four unique faces 11 means that when the module 9 is applied to a surface of an object, only the one correct fit or location of module 9 to traced outline would be sought. Further, the fact that the four faces 11 of the module 9 are unique means that four different projected beam of light patterns, each pattern made up of three light sources, would be available to the operator. Alternatively, regardless of the shape of the relocating device, if each of the four beams of cast light are a different colour, the unique orientation of the relocating device with respect to its surroundings would be established and preserved, provided the colour of each projected beam and cast dot was recorded for future reference. This is to allow the operator to choose the best projected beam of light pattern to suit the application of the three locators 4 in favourable places. If the operator finds it unacceptable to draw lines and marks on the object to denote to location for the placement of the relocating device 9, then markings visible under improved lighting only may be used, improved lighting such as ultraviolet light.

Further relating to the tetrahedral shaped embodiment of the relocating device 9, because there is no distinct top or bottom to this module 9, four switches 15 have been used and have each been located at an apex where any three faces 11 intersect. When any switch 15 is activated, only the three beams of light 3 on the three faces 11 that meet at that switch 15 are energized, the fourth beam of light is not energized as it is at the far face 11 of the module 9 and is presumed to be facing onto the surface the module 9 is applied to, so would not cast a useful projected beam. Alternatively a different switch configuration may be used.

Figure 3:
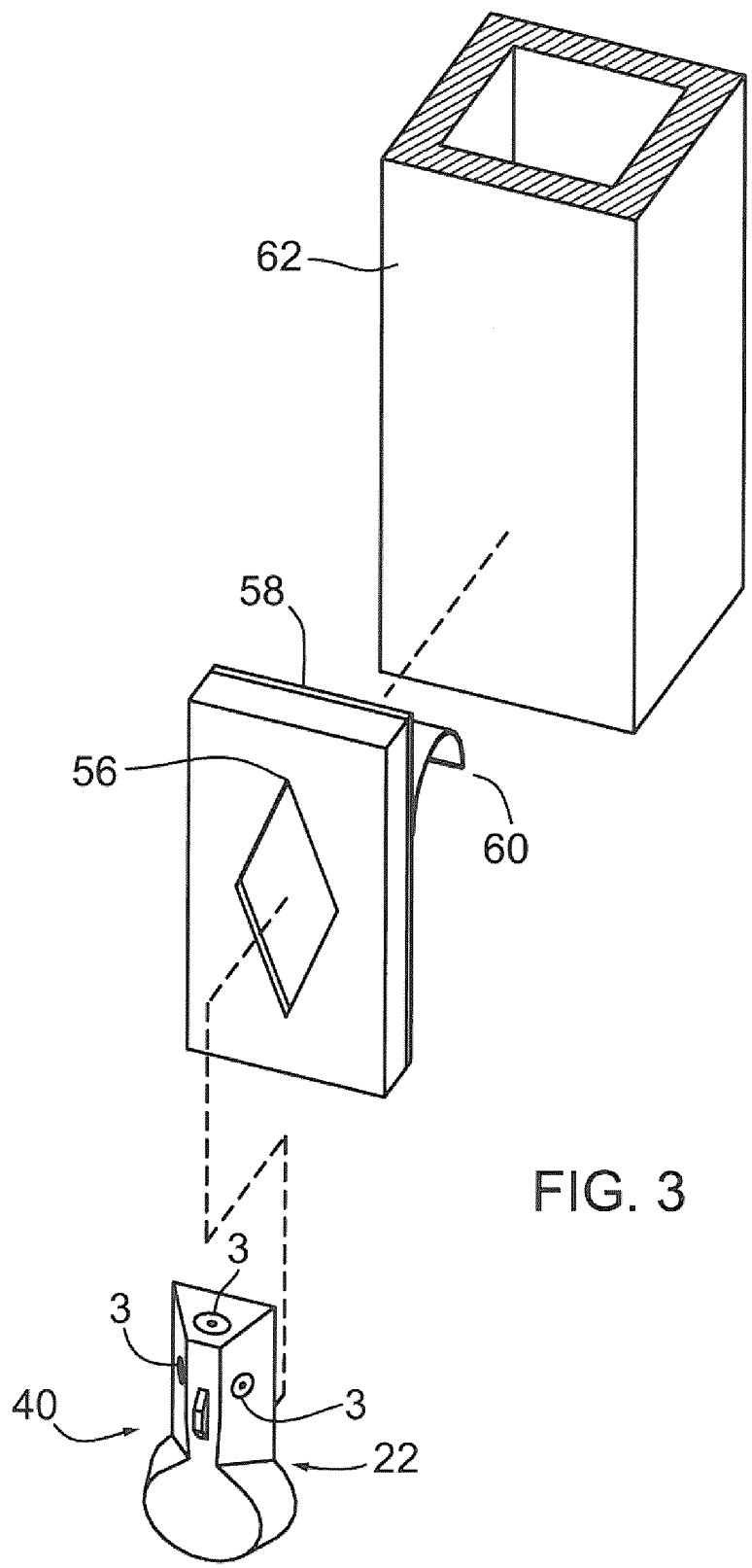
FIG. 3 is a blown apart perspective view of an embodiment of the relocating device, a mount and an object.

Shown in FIG. 3 is a relocating device mount 56 adapted to accept a releasably attachable relocating device 22. The relocating device 22 has three beams of light 3, a switch 40 to activate the beams of light 3 and houses its battery inside. The mount 56 is adapted to be applicable to an existing object 62 (a portion of square tubing is shown) by means of, for example, the adhesive strip 58 that is exposed upon removal of a protective strip 60. The adhesive strip may be double sided adhesive strip. Other means of applying the mount 56 to an existing object 62 also exist. The object 62 that accepts the mount 56 may be a part of a machine, a piece of equipment, a microphone, a stand, a transducer, an instrument, an amplifier and loud speaker combination unit, any piece of furniture or anything that is required to accept a releasably attachable relocating device 22 and that an individual deems need accept the relocating device 22. The outer surface of the mount 56 has been adapted to releasably accept the relocating device 22 while the inner surface of the mount 56 has been adapted to allow the mount 56 to be permanently attached to an object 62 or surface. This figure shows an adhesive backing 58 being exposed so the mount 56 may be attached to an object 62. The releasably attachable means between the module 22 and the mount 56 may be magnetic, mechanical or by any means that allows the relocating device 22 to be secure when attached, but when the time comes, easily removed.

Figure 4:
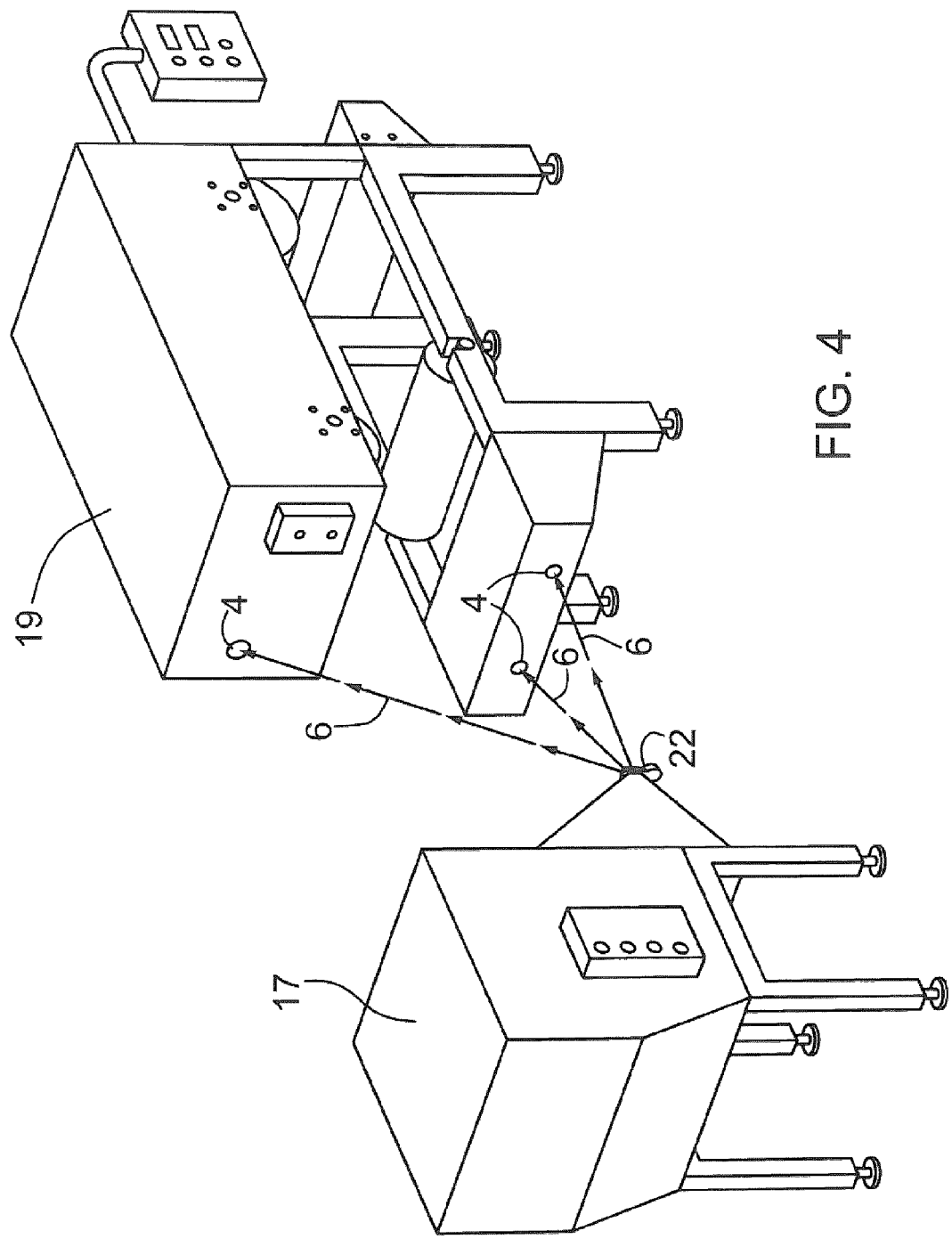
FIG. 4 is a perspective view of an embodiment of the relocating device in use with multiple pieces of machinery.

FIG. 4 illustrates the use of applied locators 4 and relocating device 22 for re-establishing the location of a first piece of machinery 17 with respect to a second piece of machinery 19. Initially it had been the case that the relocating device 22 had been applied to the first piece of machinery 17, the beams of light had been energized and locators 4 had been applied to the second piece of machinery 19 at the points where the cast beams of light 6 terminated. The module 22 had been removed and the first piece of machinery 17 had been sent out for repairs. Now that the first piece of machinery 17 has been repaired and returned, the relocating device 22 is again applied at the same place on the first piece of machinery 17 and the placement of that piece of machinery 17 has been adjusted until the cast beams of light 6 again fall on the applied locators 4 at the second piece of machinery, confirming that the first piece of machinery 17 has been placed in the correct location with respect to the second piece of machinery 19.

Figure 5:
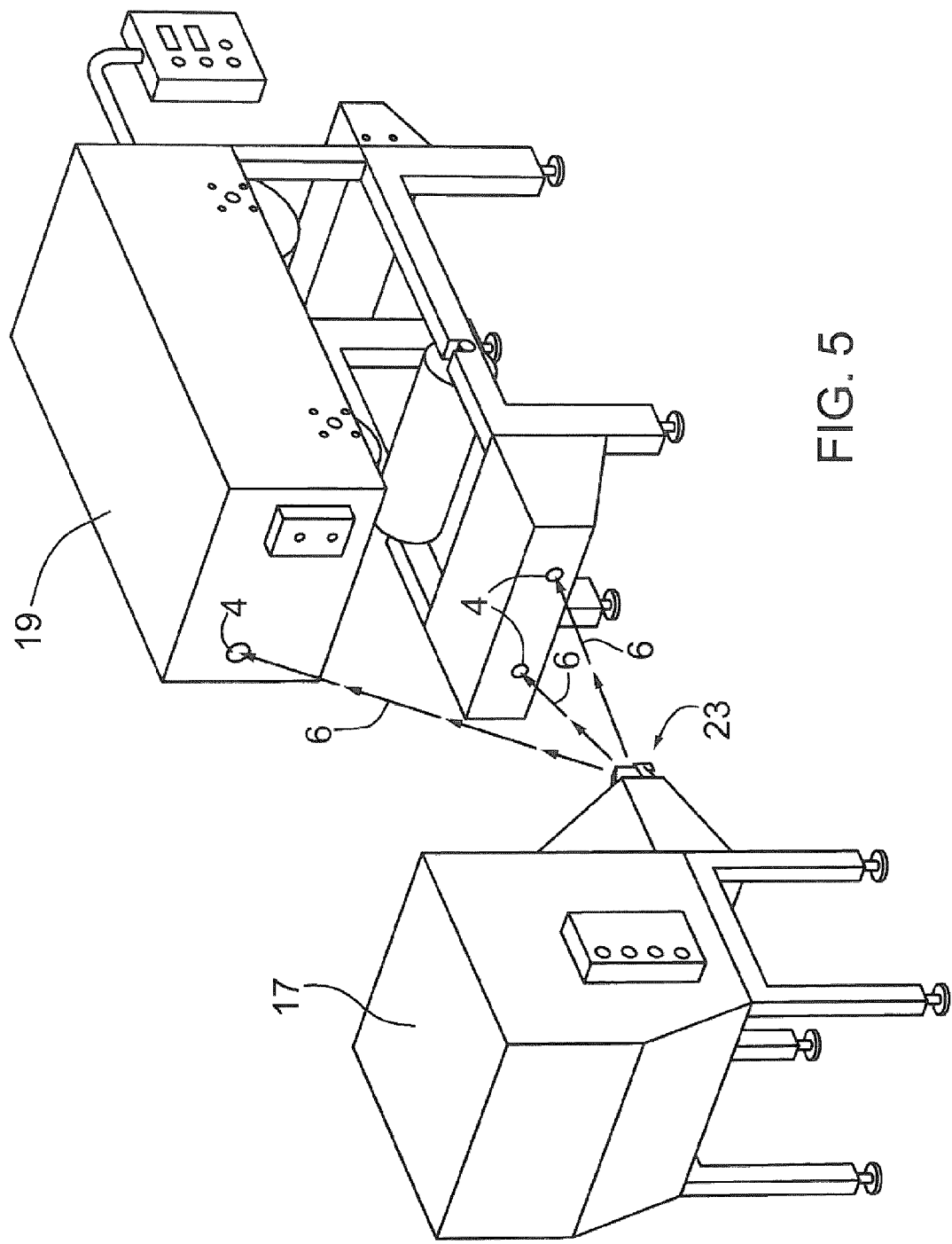
FIG. 5 is a perspective view similar to that shown in FIG. 4 but showing an embodiment of the relocating device wherein the direction of the light beams are adjustable.

Illustrated in FIG. 5 is the alternative method of employing the module and locators to locate and relocate an object in its surrounding environment. Similar to the illustration in FIG. 4, there are two parts of a machine being aligned with respect to each other. As it is in FIG. 5, the first piece of machinery 17 was fitted with an adjustable beam of light type relocating device 23, the beams of light were energized, the beams of light were adjusted until they projected onto suitable surfaces of the second piece of machinery 19 and locators 4 were applied to the surface of the second piece of machinery 19 at the three places were the cast beams of light 6 terminated. The module 23 was removed, the second piece of machinery 19 was sent out for repairs, it was repaired and has been returned. The first piece of machinery 17 has been refitted with the relocating device 23, each beam of light of the module 23 has had its direction adjusted to be the same as during the initial phase, the beams of light were energized and the second piece of machinery 19 has now had its placement adjusted until the three cast beams of light 6 again fall on the applied locators 4, confirming the accurate replacement of the second piece of machinery 19 with respect to the first piece of machinery 17.

Figure 6:
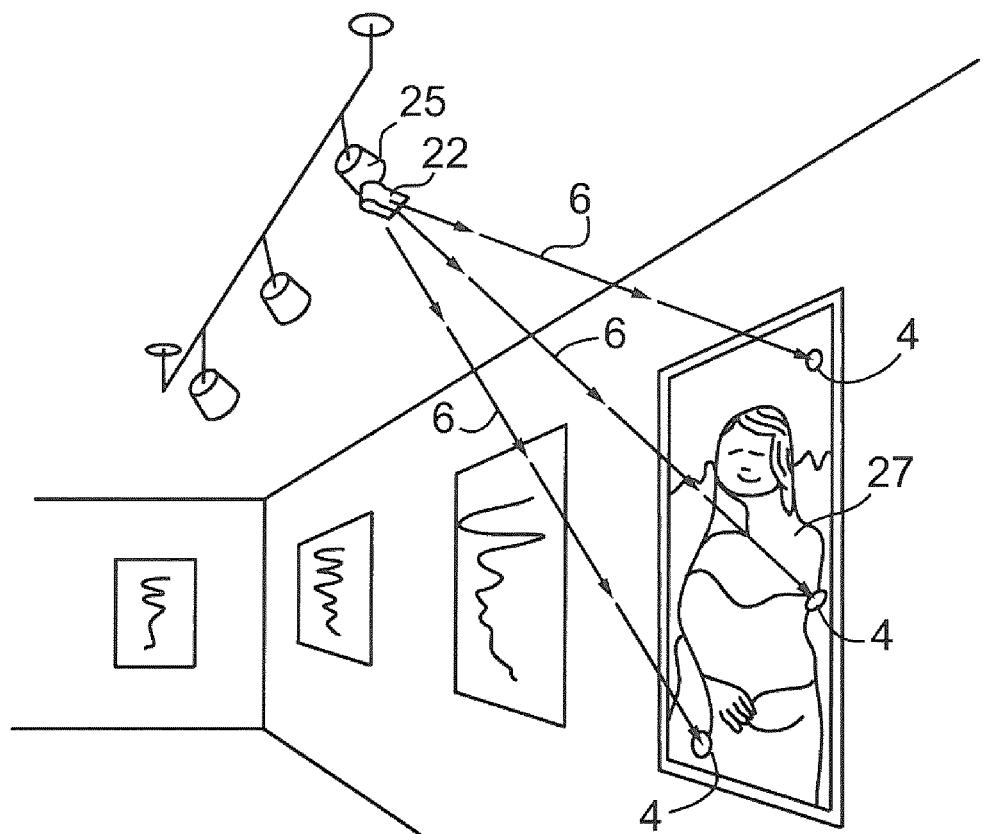
FIG. 6 is a perspective view of an embodiment of the relocating device showing the relocating device attached to a light fixture as used in art gallery.

FIG. 6 illustrates the use of the releasably attachable relocating device 22 and applied locators 4 to confirm the alignment of a light fixture 25 with respect to a work of art 27 at an exhibition. The light fixture 25 is part of a track lighting system and so is adjustable. The best suited application of the light fixture 25 to display the work of art 27 had been established during an earlier showing of the exhibition, so during this showing, the light fixture 25 has been brought to bear on the work of art 27 the same as during the earlier showing. During the initial showing, the lighting set up had been established, the relocating device 22 had been attached to the light fixture 25, the beams of light energized and locators 4 had been applied to the work of art. Now that the same set up is to be re-established, the module 22 is applied to the light fixture 25, the beams of light are energized and the alignment of the cast beams of light 6 with the applied locators 4 will confirm that the preferred alignment has been re-established. In this case, the relocating device 22 will have to apply to the light fixture 25 the same way each time.

Figure 7:
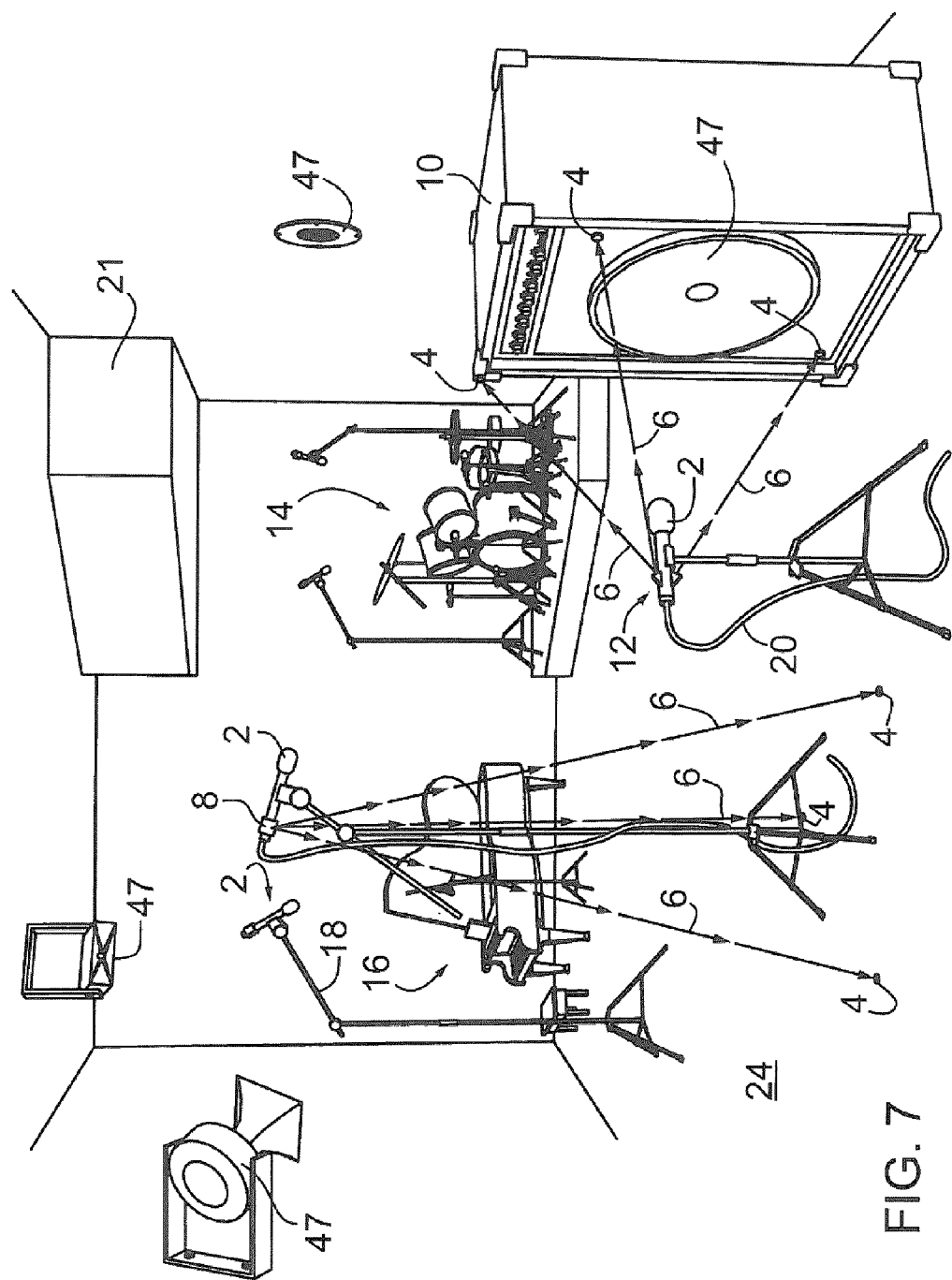
FIG. 7 is a perspective view showing a plurality of embodiments of the relocating device as used in a music studio.

Shown in FIG. 7 is a sound studio for either practicing or recording purposes. This figure shows the general placement of musical instruments, wall and ceiling mounted transducers of the loud speaker type, the placement of an amplifier and loud speaker combination unit and of microphones and their stands. Additionally, the structures built in to the studio proximate the drum set are shown. These structures are used to assist in controlling sound in the studio. The figure is also intended to illustrate the amount of control artists and engineers attempt to take of the sounds that develop in the studio. Shown, in the middle of the figure, is a microphone 2 that has been assigned an address relative to the studio 24 by the application of locators 4 at the places where the cast beams of light 6 projected from the relocating device 8 terminate upon hitting the floor. Additionally, another microphone 2 placed close to the transducer 47 of an amplifier and loud speaker combination unit 10 is assigned its address relative to the amplifier and loud speaker combination unit 10 by the application of locators 4 at the places where the cast beams of light 6 from the relocating device 12 terminate on the amplifier and loud speaker combination unit 10 proximate the transducer 47. In this case, the relocating device 12 is integral with the microphone's cable 20. Also shown, left to right across the rear of the figure, is a microphone 2 placed on a boom 18 far from any instruments, a piano 16 and its microphone and a drum set 14 with its sound control paneling 21 and microphones.

Mounted with a bracket on the left wall of the studio is a transducer 47 of the sound reinforcement performance type, while from the ceiling is mounted a similar transducer 47 that has a cabinet around it. Mounted directly in the right wall is another transducer 47 typically of the type used for background music or a public address system. The operation and role of any relocating device or module is the same in all applications; whether the cast beams of light 6 terminate on a surface in the environment surrounding the set up or on another piece of equipment, the objective is to establish the places where the locators are to be applied. Since the cast beams of light are projected outwardly from the relocating device, if three non-coplanar cast beams of light and three locators are used, a virtual tripod is created that established the unique location of the relocating device, and so the unique location of the object the relocating device or module is attached to. The unique locations of the module and object are with respect to the three locators that have been applied. In one embodiment the sizes of the side of the relocating device or module are unique and the beams of light are arranged such that the angles between the beams of light are unique. In another embodiment the sides of the relocating device or module are the same and the beams of light are arranged such that the angles between the beams of light are the same.

Figure 8:
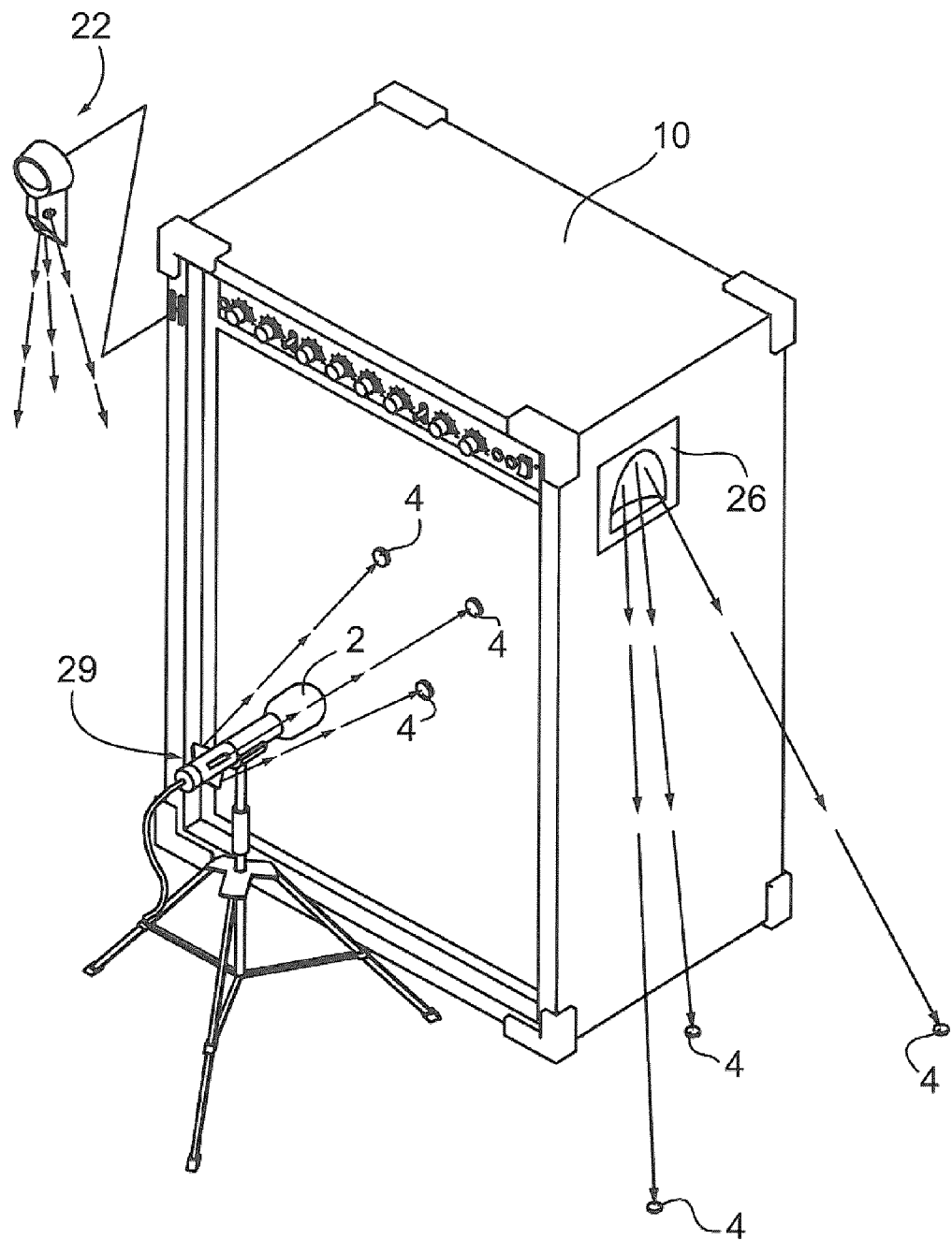
FIG. 8 is a perspective view showing embodiments of the relocating device in association with an amplifier and loud speaker combination unit, including a relocating device integrally attached to the amplifier and loud speaker combination unit, a relocating device releasably attached to the amplifier and loud speaker combination unit and a relocating device attached to a microphone positioned adjacent to the amplifier and loud speaker combination unit.

Since the location of the sound sources and other pieces of equipment relative to both the environment and the microphones 2 are just as important to maintaining the "sound" as is correctly placing the microphones themselves, it may be necessary that a relocating device be applied to the other pieces of equipment to assist in placing them too. Shown in FIG. 8 is a releasably attachable relocating device 22 shown exploded from an amplifier and loud speaker combination unit 10. The relocating device 22 has been adapted to allow releasable attachment of it to the amplifier and loud speaker combination unit 10. A pair of slots in the amplifier and loud speaker combination unit 10 and corresponding extensions (not shown) on the body of the relocating device 22 allow the module to be applied to and removed from the amplifier and loud speaker combination unit 10 many times, while attaching the same way each time. Any number of alternative releasable attachment means may have been used. Further shown in FIG. 8 is an integral relocating device 26 built into an amplifier and loud speaker combination unit 10 and the locators 4 paired with this module 26 are shown applied to the floor beside the amplifier and loud speaker combination unit 10. Shown immediately in front of the amplifier and loud speaker combination unit 10 is an embodiment of the relocating device 29 that is integral with an electrical connector adapted to connect between a cable and a microphone. One of the three beams of light used in this embodiment of integral relocating device 29 has a projected direction that is generally parallel to the direction the microphone is pointing and the three locators for this application are shown applied to the amplifier and loud speaker combination unit 10. Accordingly it could be said that the relating device is integrally attached to the first object.

Figure 9:
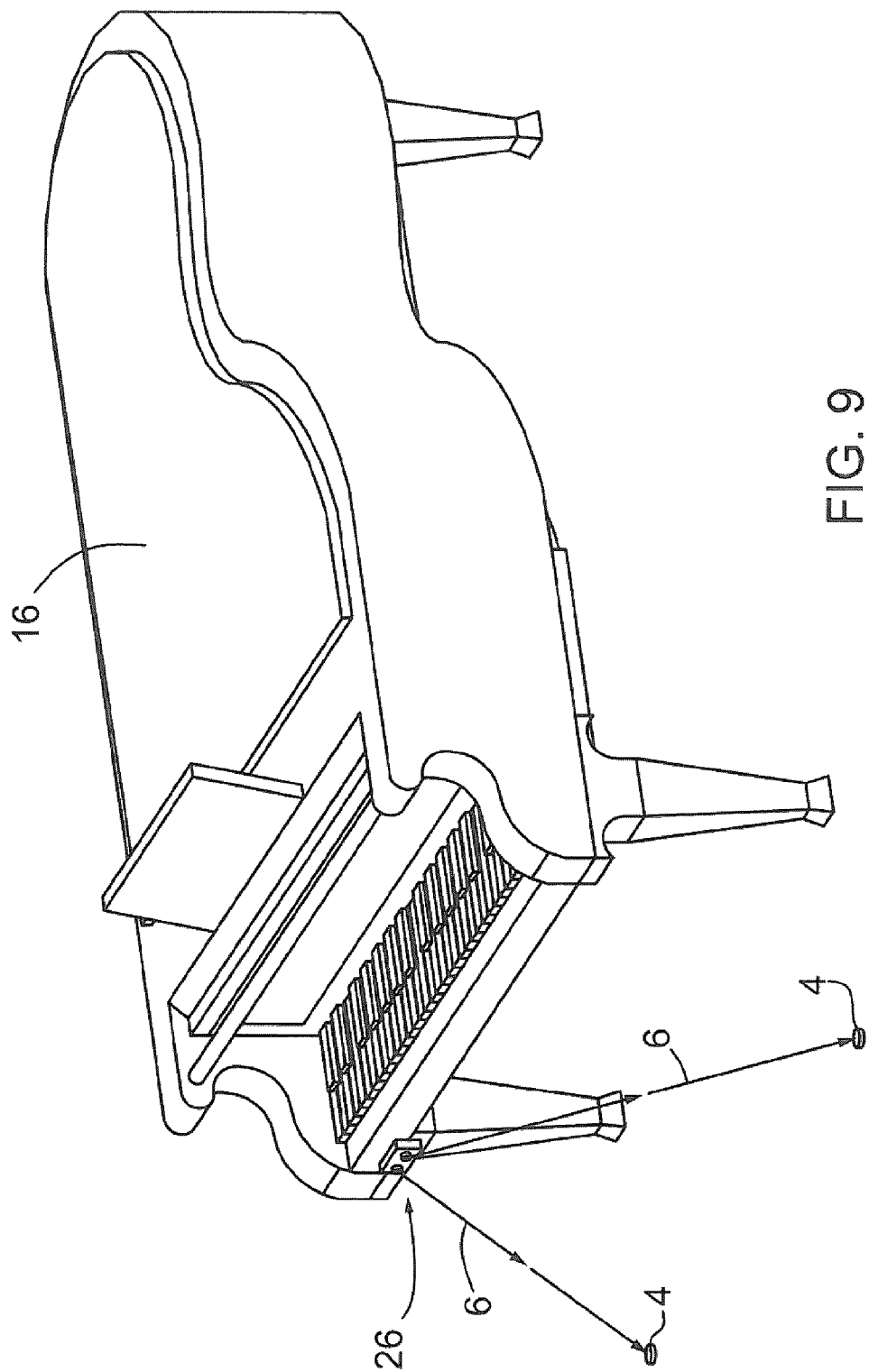
FIG. 9 is a perspective view of a grand piano having an embodiment of the relocating device attached thereto.

Shown in FIG. 9 is a relocating device 26 attached permanently to a piano 16. This embodiment of the relocating device employs only two beams of light as alignment of both the cast beams of light 6 with both applied locators 4 will assure correct placement of the piano 16. Since in this instance, the height of the piano 16 does not change from one use to the next, a third beam of light is not required to uniquely relocate the piano 16 in its six degrees of freedom, assuming the operator places the piano 16 facing the correct direction and so does not have it turned 180 degrees.

Figure 10:
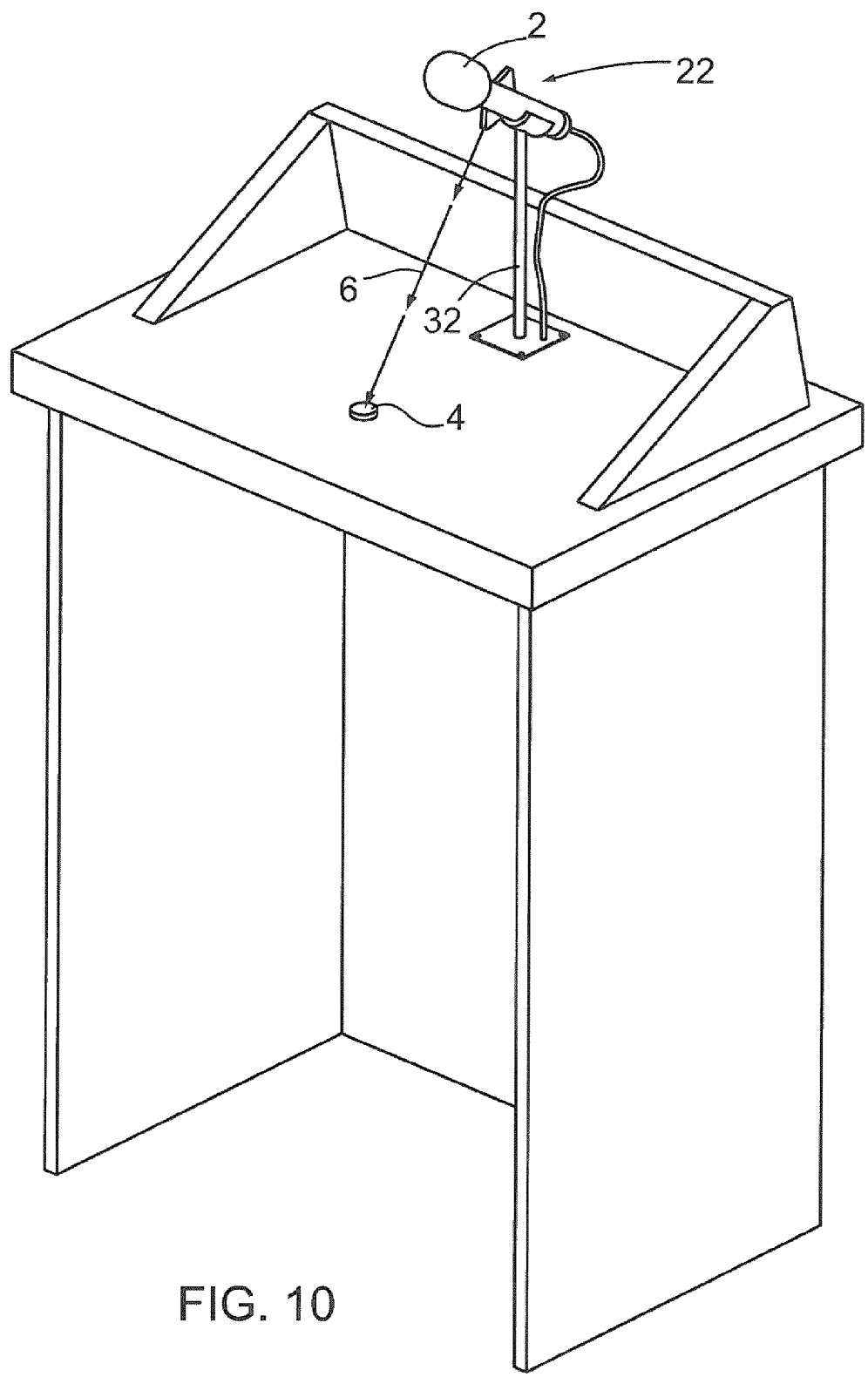
FIG. 10 is a perspective view of an embodiment of the relocating device attached to a microphone on a podium.

FIG. 10 shows a microphone 2 with an embodiment of the releasably attachable relocating device 22 that casts a single beam of light 6 and so uses a single locator 4 to correctly place the microphone 2. In this case, since the microphone stand 32 is fixed to the podium so that only very limited movement of the microphone 2 is available, five of the six degrees of freedom are already defined, so only one cast beam of light 6 is required to completely place the microphone 2 in all six degrees of freedom.

Figure 11:
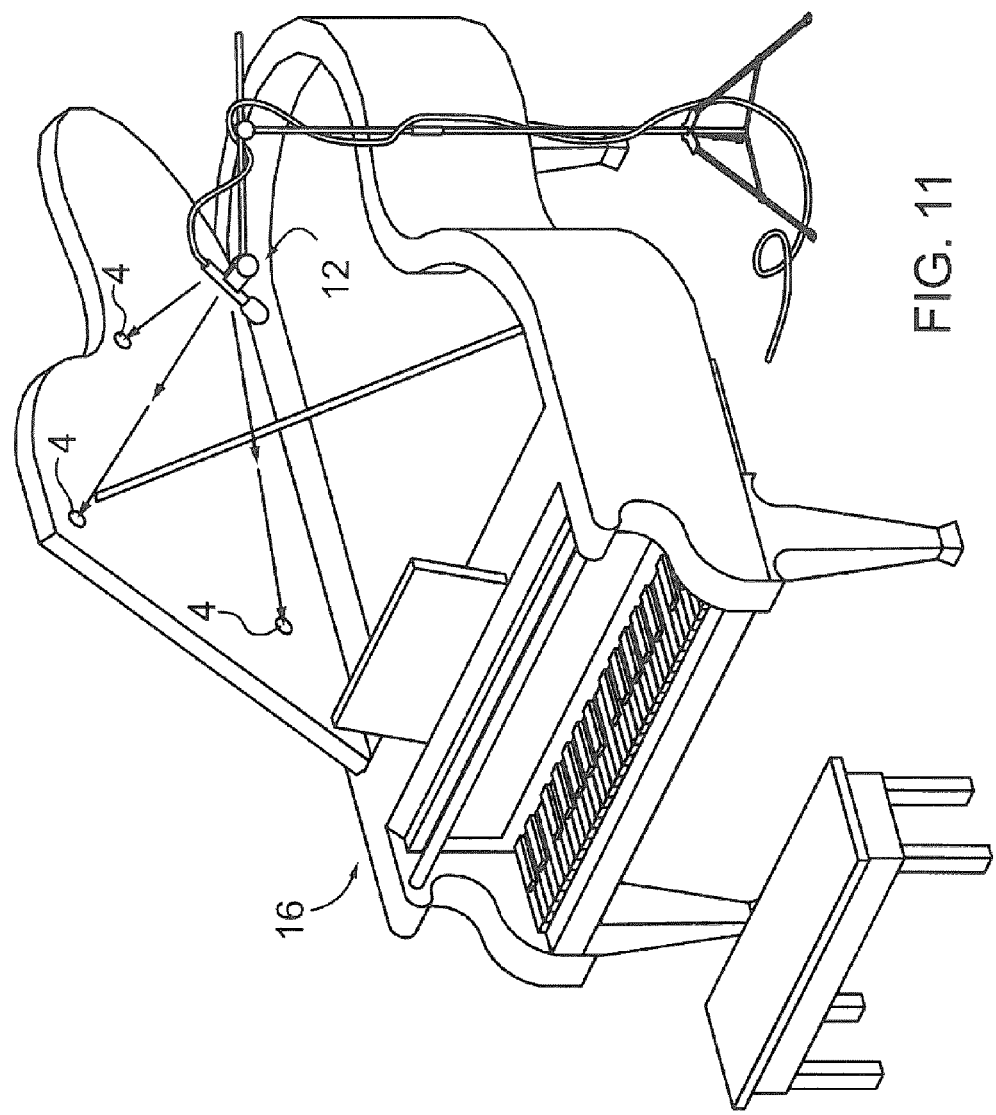
FIG. 11 is a perspective view showing a grand piano and a microphone having an embodiment of the relocating device attached thereto in position over the piano.

Illustrated in FIG. 11, three locators 4 are applied on the lower surface of the lid of the piano 16, such that the placement of the locators 4 might be hidden from plain view. By pairing the piano 16, the applied locators 4 and the microphone with integral relocating device 12, the established sound may be generated and picked up each time these pieces of equipment are assembled.

Figure 12:
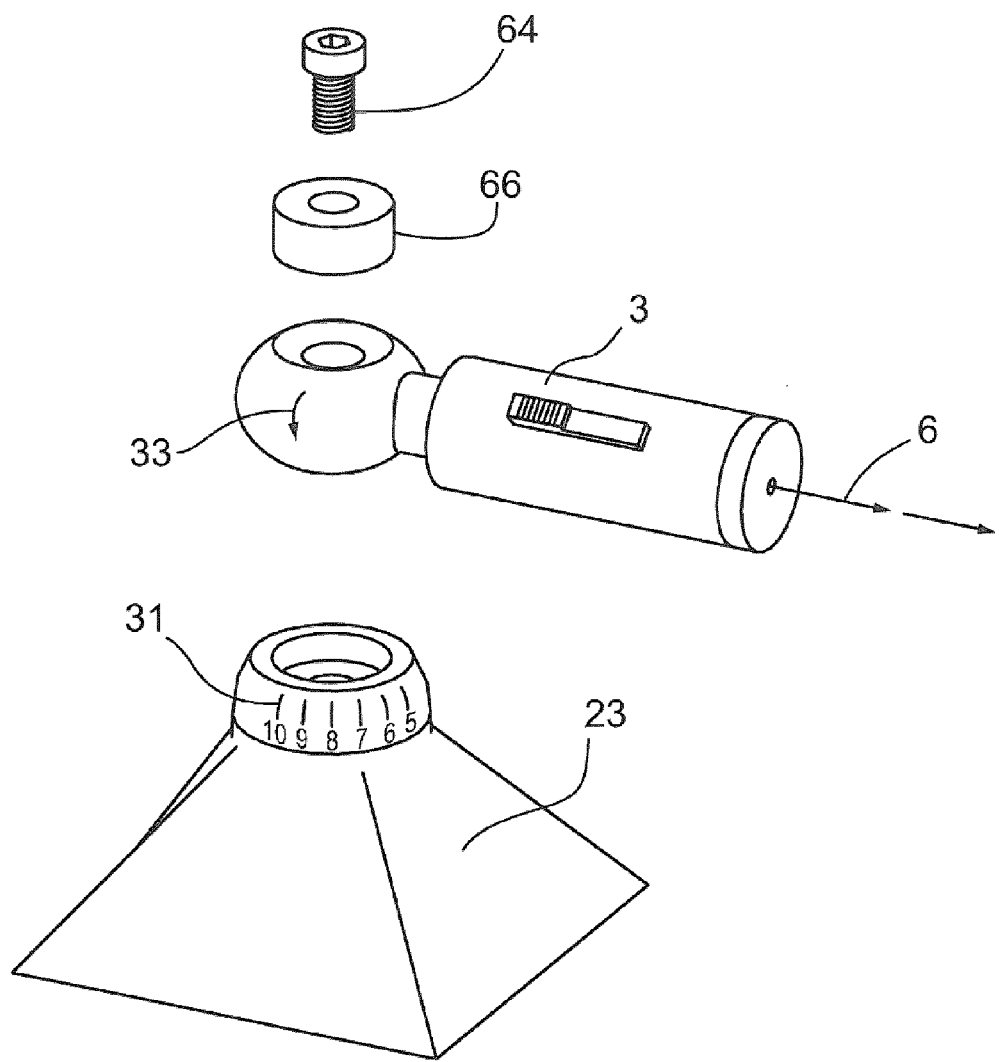
FIG. 12 is a blown apart perspective view of an adjustable embodiment of the relocating device.

The exploded perspective view of relocating device 23 shown in FIG. 12 illustrates an alternate embodiment of releasably attachable relocating device 23 adapted with a beam of light 3 that has an adjustable direction of projection. By loosening the thumb screw 64, the direction of the beam of light 6 cast from the beam of light 3 is allowed to be adjusted. When the screw 64 is tightened, the beam of light 3 is fixed between washer 66 and module 23, so the adjusted position is maintained. This embodiment of module allows the projected direction of the cast beam of light 6 to be in a wide variety of directions, directions that are independent of the attitude of the module 23 itself. The direction-denotable aspect of the adjustable beam of light 3 is realized with markings 31 on the module 23 and markings 33 on the beam of light 3. Combined, these markings would allow the operator to denote the direction the beam of light 3 pointed with respect to the module 23 during a particular application. During each use of the module 23, the denoted settings would be recorded along with other specific data relating to that specific use of the module 23 and the locators in order to be able to reconstruct the same set up at a future time.

Figure 13:
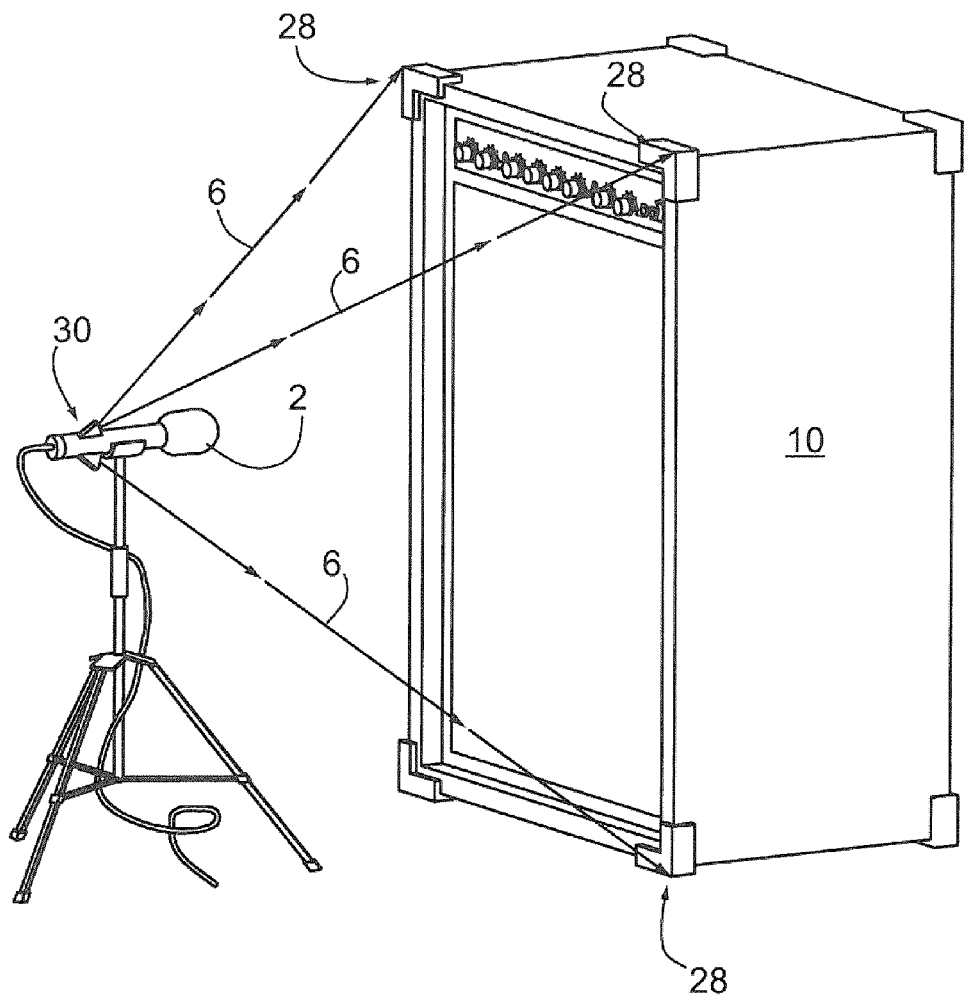
FIG. 13 is a perspective view of an adjustable embodiment of the relocating device used in association with a microphone so that the light beams may be located at defined points on a second object.

An advantage of having a module 23 that allows the projected direction of the cast beam of light 6 to be adjustable, lockable and position-denotable is that locators may be selected from the inventory of existing distinct features that are likely to be present in the environment surrounding the setup, as illustrated in FIG. 13. Selectable, existing features of objects include corners 28 of objects, exposed fasteners, existing graphics and logos and handles and knobs of equipment. The adjustable nature of the beam of light 3 and the releasable attachment aspect of the module 23 itself will greatly increase the chances of the module being used successfully without the use of actual applied locators. In FIG. 13, the three corners 28 of the amplifier and loud speaker combination unit 10 are used as locators for the relative placement of the microphone 2 that has an integral relocating device with adjustable beams of light 30. Since the cast beams of light 6 have their directions of projection adjustable, the option exists for selecting the corners 28 of the amplifier and loud speaker combination unit 10 as locators. Along with the settings from each of the three beams of light, the fact that the corners 28 of the amplifier and loud speaker combination unit 10 were selected and used as locators during this set up would need to be recorded or logged in order to use the data for reconstructing the same set up at a future date.

The aspect of modules employing beams of light that are adjustable, lockable and each having setting that are denotable or definable independently of the other beams of light and independently of the relocating device itself, as described above, is also applicable to modules bearing any number of beams of light, as well as to modules that are integral with objects or modules that are employed with mounts. Similarly, other means of constructing a module to bear beams of light that are adjustable, lockable and position-denotable are likely to exist. The above description is by of example only.

Figure 14:
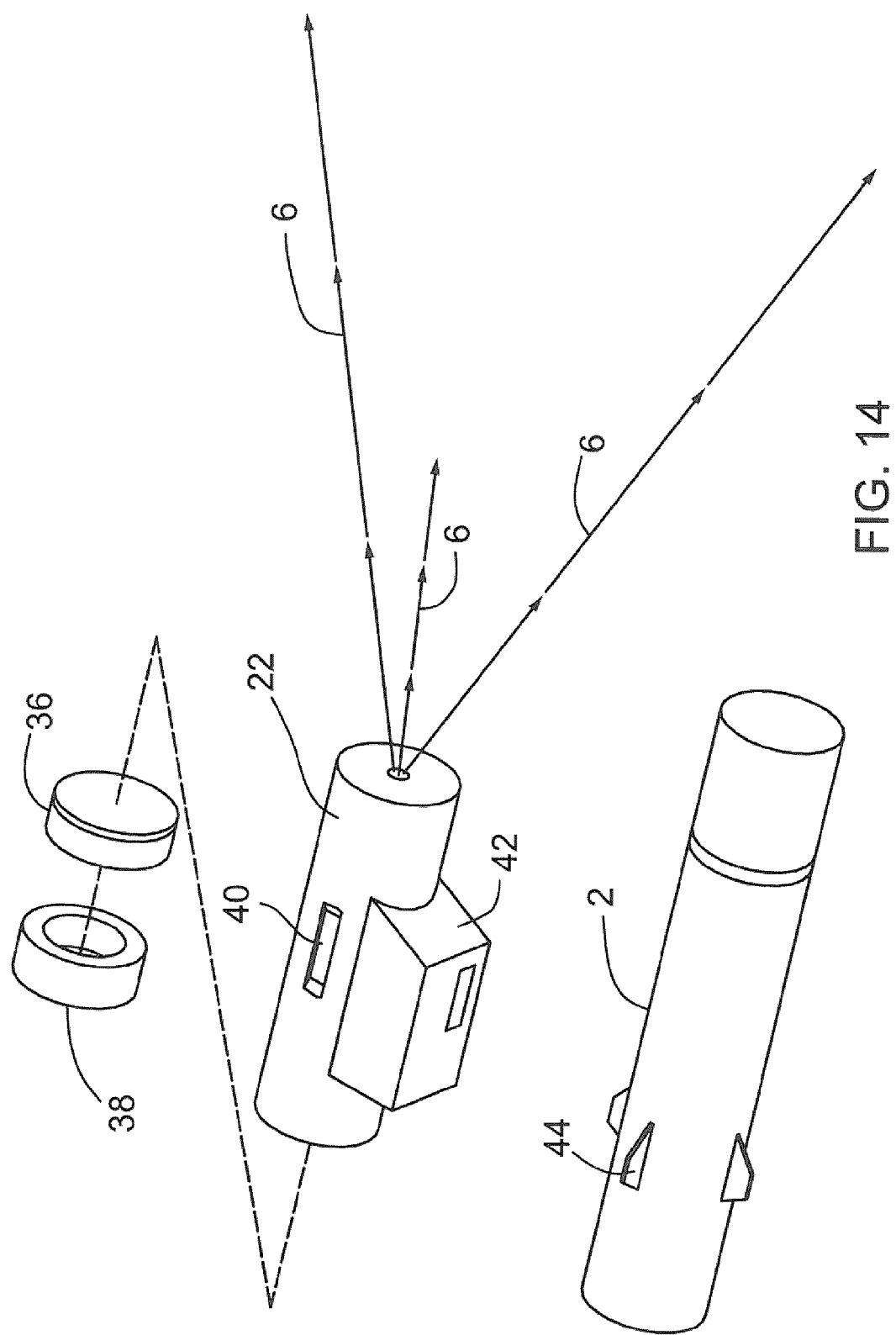
FIG. 14 is a blown apart perspective view of an embodiment of the relocating device wherein a single light source is split into three beams of light and the relocating device is used in association with a microphone and further showing a battery cover and battery.
Figure 15:
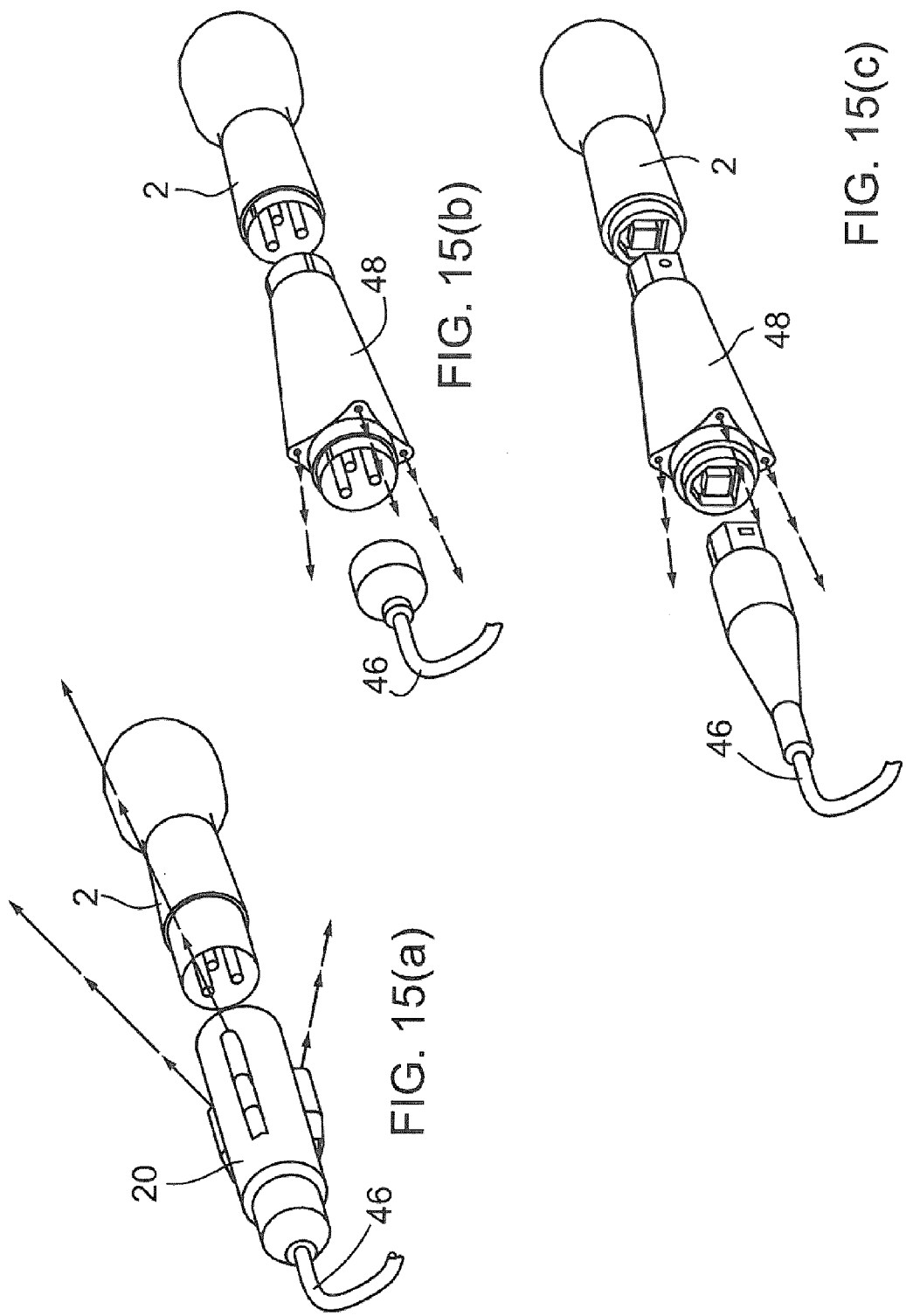
FIGS. 15 (a), (b) and (c) are blown apart perspective views of embodiments of the relocating device shown in use with a microphone with (a) showing the relocating device integrally attached to a cable; (b) showing the relocating device having an XLR connector and being between a cable and the microphone; and (c) showing the relocating device having a USB type connector and being between a cable and the microphone.

Looking closer at the relocating devices, FIG. 14 shows an exploded view of a releasably attachable relocating device 22. The module 22 has a battery 36, a battery door 38, a switch 40, a single beam of light that is split into three cast beams of light 6 and a means of releasably attaching the relocating device 22 to a microphone 2. The releasably attachable means shown here is by a magnetic node 42 in the relocating device 22 and a fitted slot 44 in the microphone 2. Several fitted slots 44 are built into the microphone 2 to assure eased use of the relocating device 22 in placing the microphone 2 in a crowded studio 24. Further, FIG. 15 shows three embodiments of a relocating device adapted for use between the microphone 2 and the microphone cable 46. In the upper embodiment the relocating device 20 is integral with the microphone cable itself. In the lower two embodiments, the relocating device is integral with an electrical cable adapter 48. The middle embodiment illustrates the use of an XLR type electrical connector and the lower embodiment illustrates the use of an USB type connector.

Figure 16:
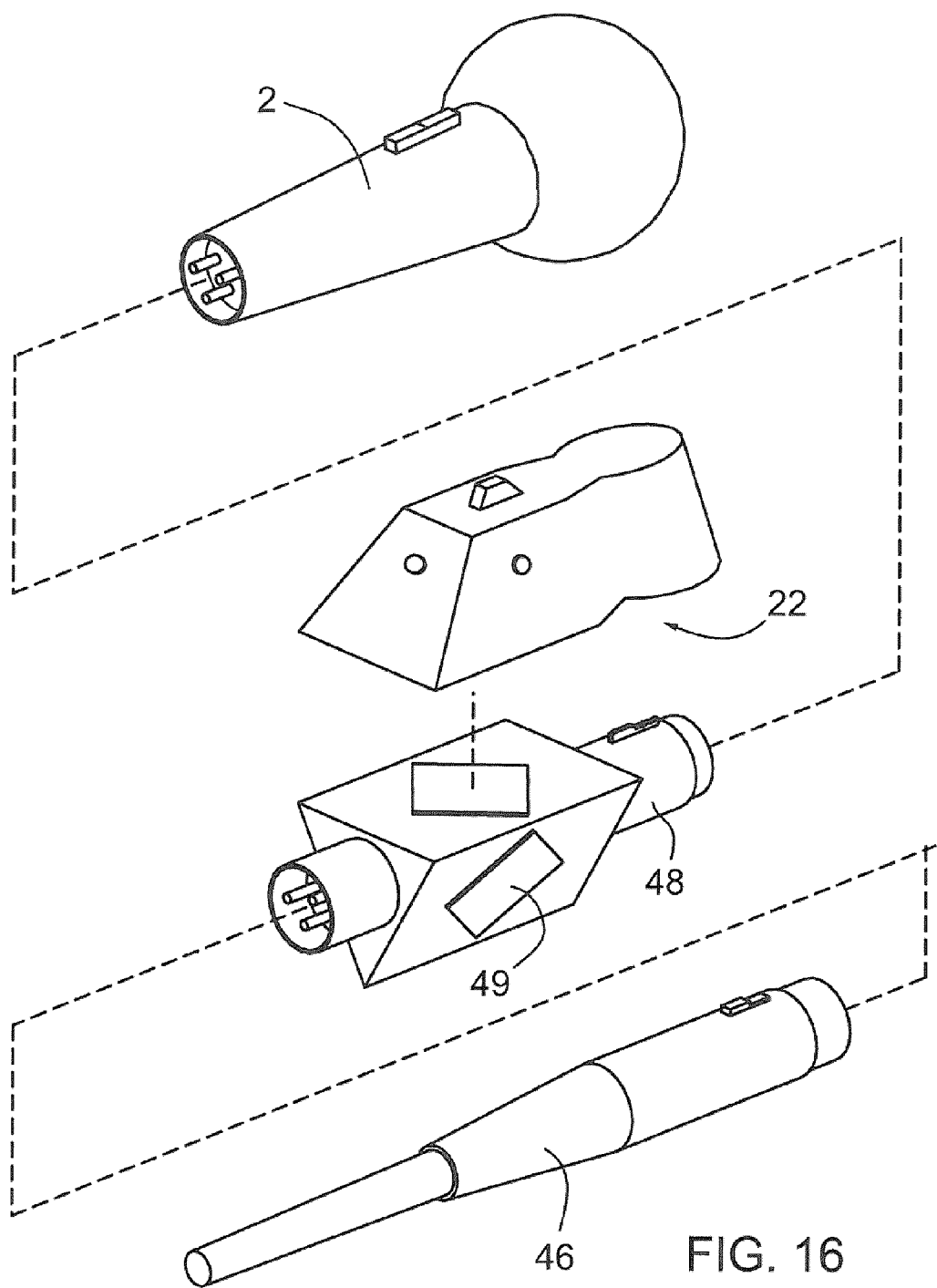
FIG. 16 is a blown apart perspective view of an embodiment of the relocating device showing the relocating device releasably connectable to a mount having an XLR connector and being between a cable and the microphone

An additional embodiment of the releasably attachable relocating device 22 is shown in FIG. 16, where the module 22 is shown as it applies to an electrical connector 48 adapted to accept releasable attachment of the module 22 in plurality of mounting positions 49. The microphone cable 46 secures to one end of the connector 48, the microphone 2 secures to other end of the connector 48 and so allows the relocating device 22 to be applied to any existing microphone cable 46 and any existing microphone 2. This embodiment allows application of this beam of light and locator placement method to be applied to a multitude of existing microphones and cables.

Figure 17:
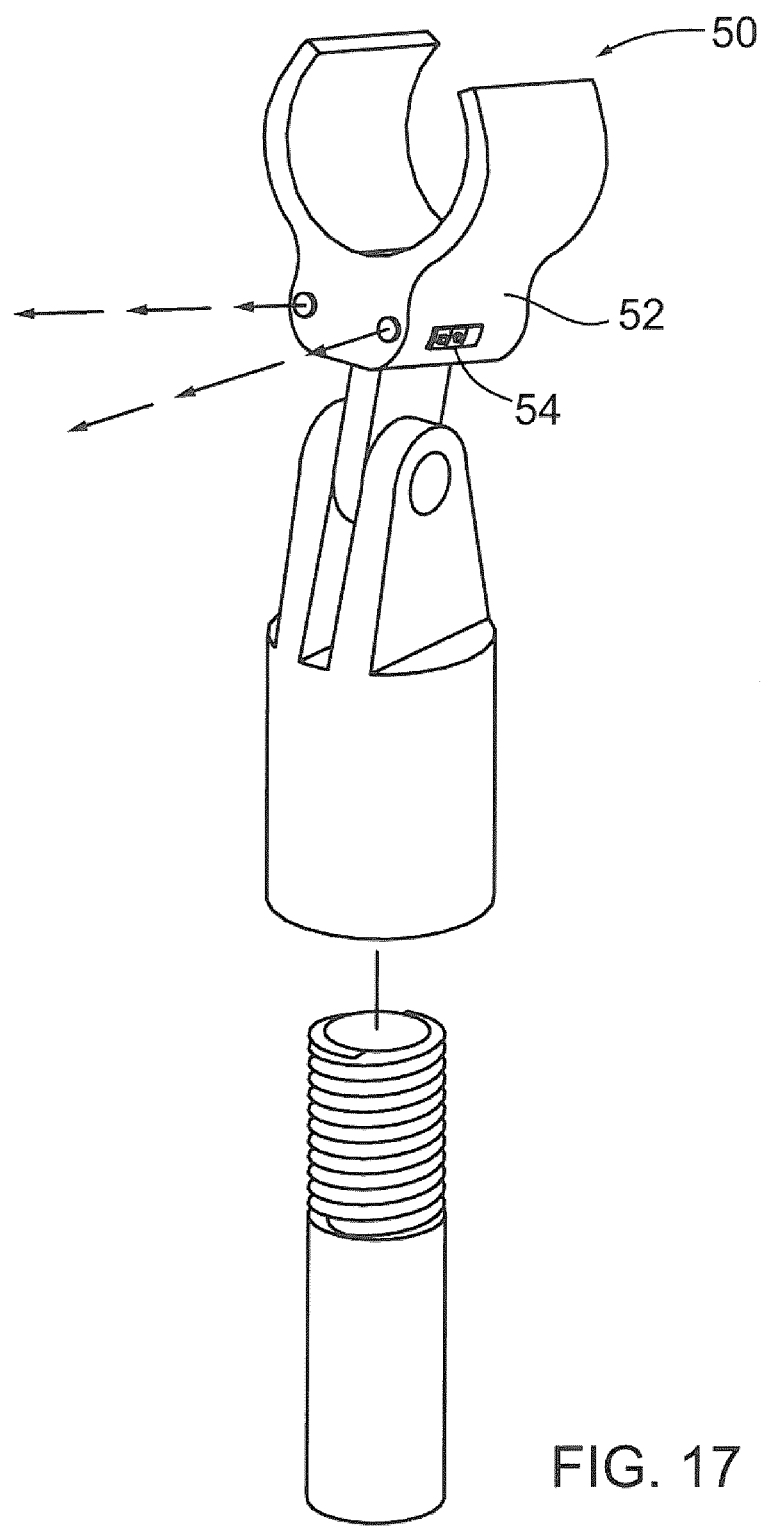
FIG. 17 is a perspective view of an embodiment of the relocating device wherein the relocating device is integrally attached to a microphone clip.

FIG. 17 illustrates an application of a microphone clip 50 adapted to have an integral relocating device 52. Further, this relocating device 52 embodies an integral level 54 for establishing the orientation of the microphone. This embodiment illustrates a relocating device 52 that uses two cast beams of light 6 and the level 54 to place the microphone. With the level 54 used, one fewer beam of light is required to place the microphone. Additionally, a plumb (not shown) may be applied in place of the level 54. The beams of light, battery and switch are integral with the clip so that, when the microphone is in the clip, the placement of the microphone is possible.

Figure 18:
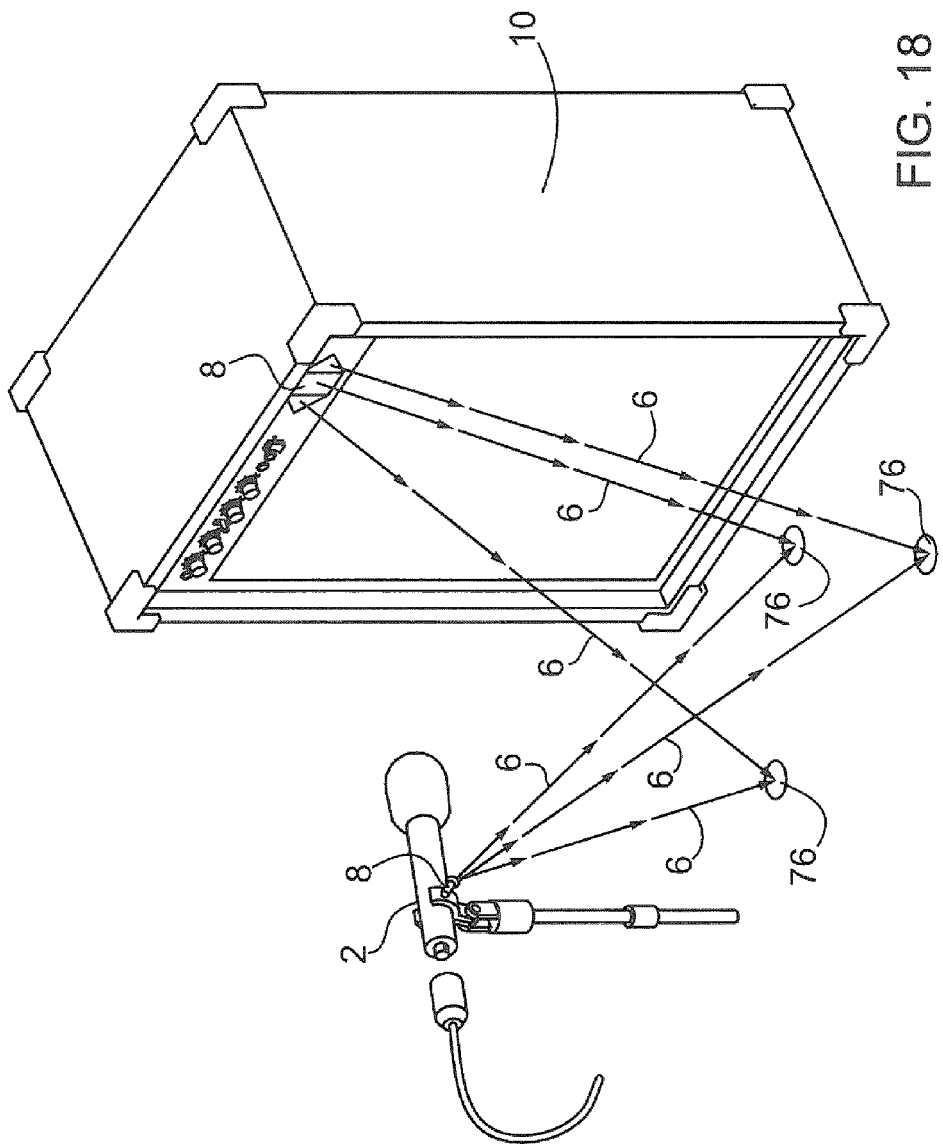
FIG. 18 is a perspective view of two embodiments of the relocating device wherein a first relocating device is attached to first object and a second adjustable relocating device is attached to a second object and the light beams for the second adjustable relocating device are arranged so that they intersect a third object coincident with the beams of the first relocating device.

Shown in FIG. 18 is an arrangement of two relocating devices 8, the first one integral with an amplifier and loud speaker combination unit 10 casting beams of light 6 and establishing the placement of cast dots 76 such that the cast beams of light 6 from the second relocating device 8 applied to the microphone 2 is trained on the initial cast dots 76 so as to place the microphone 2 relative to the amplifier and loud speaker combination unit 10 without the application of actual durable locators 4.

Figure 19:
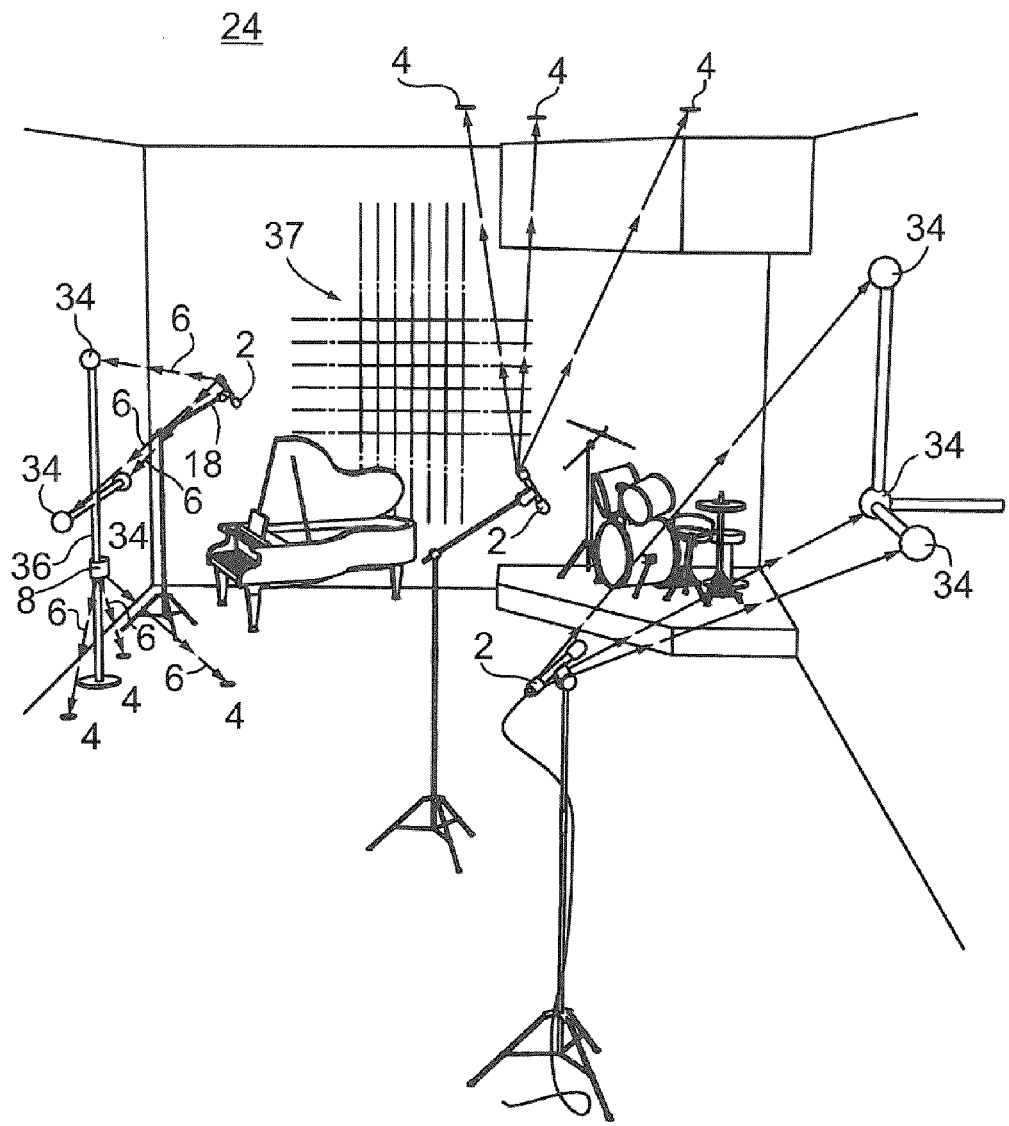
FIG. 19 is a perspective view of recording studio showing a plurality of embodiments of the relocating device and showing different ways that the beams from the relocating devices may be positioned on another object.
Figure 20A:
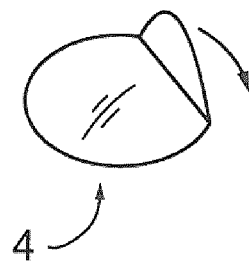
FIGS. 20 (a), (b), (c) and (d) are perspective views of embodiments of applicators with (a) being an adhesive dot; (b) an adhesive dot with a cross hairs; (c) a marker making an "X"; and (d) an adhesive label with an "X" and an identifier.
Figure 20B:
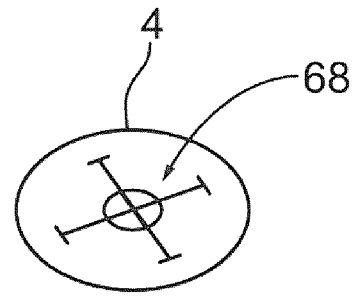
Figure 20C:
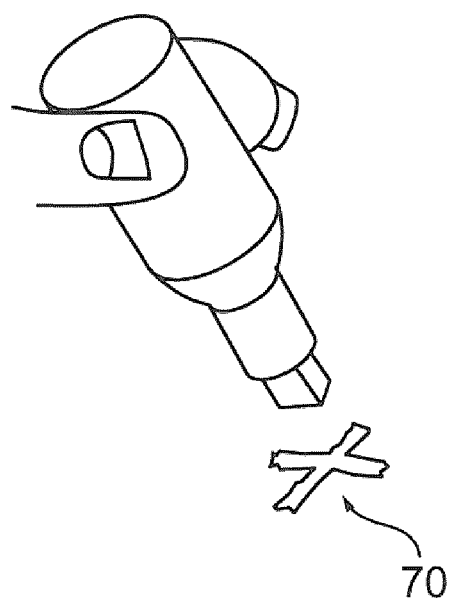
Figure 20D:
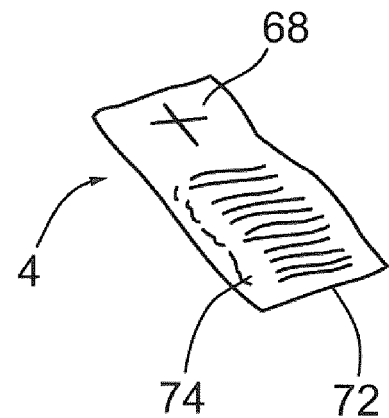

Illustrated in FIG. 19 are several alternative locator types and placements. In the center of the figure, a microphone 2 is placed relative to locators 4 that have been applied to the ceiling of the studio 24. The placement of locators 4 on the ceiling, allows the locators 4 to be accessed without the cables, stands and clutter that may exist on the studio floor. Further, at the left of the figure is shown a boom 18 mounted microphone 2 placed relative to stand based locators 34, the stand 36 of which is itself located in the studio 24 by way of a relocating device 8 and the cast beams of light 6 and locators 4 applied to the floor of the studio 24. This embodiment of the locators 34 allows the locators 34 to be placed where they will be accessible by other cast beams of light 6 for other pieces of equipment, while allowing the locators 34 and stand 36 to be moved or removed from the studio 24 as needs arise. Similarly, on the right of the figure is shown a microphone 2 placed relative to locators 34 that are applied to the wall of the studio 24. Additionally, shown applied to the far wall of the studio is a grid of lines 37 that allow cast beams of light to be located with respect to these coordinates depending on where they terminate upon hitting the wall.

Shown in FIG. 20 are a variety of locators. Clockwise from the upper left is an applied locator 4 of plastic film or paper, next is a similar locator 4 having an alignment symbol such as crosshair pattern 68 to assist in cast beam of light and locator alignment. Next is a simple application of an ink "X" 70 applied with a marker. Finally at the lower left is a locator 4 adapted to bear a crosshair "X" and a bar code 72 and serial number 74. The bar code 72 or serial number 74 will allow details relating to the use of that locator 4 to be stored in a file.

Figure 21:
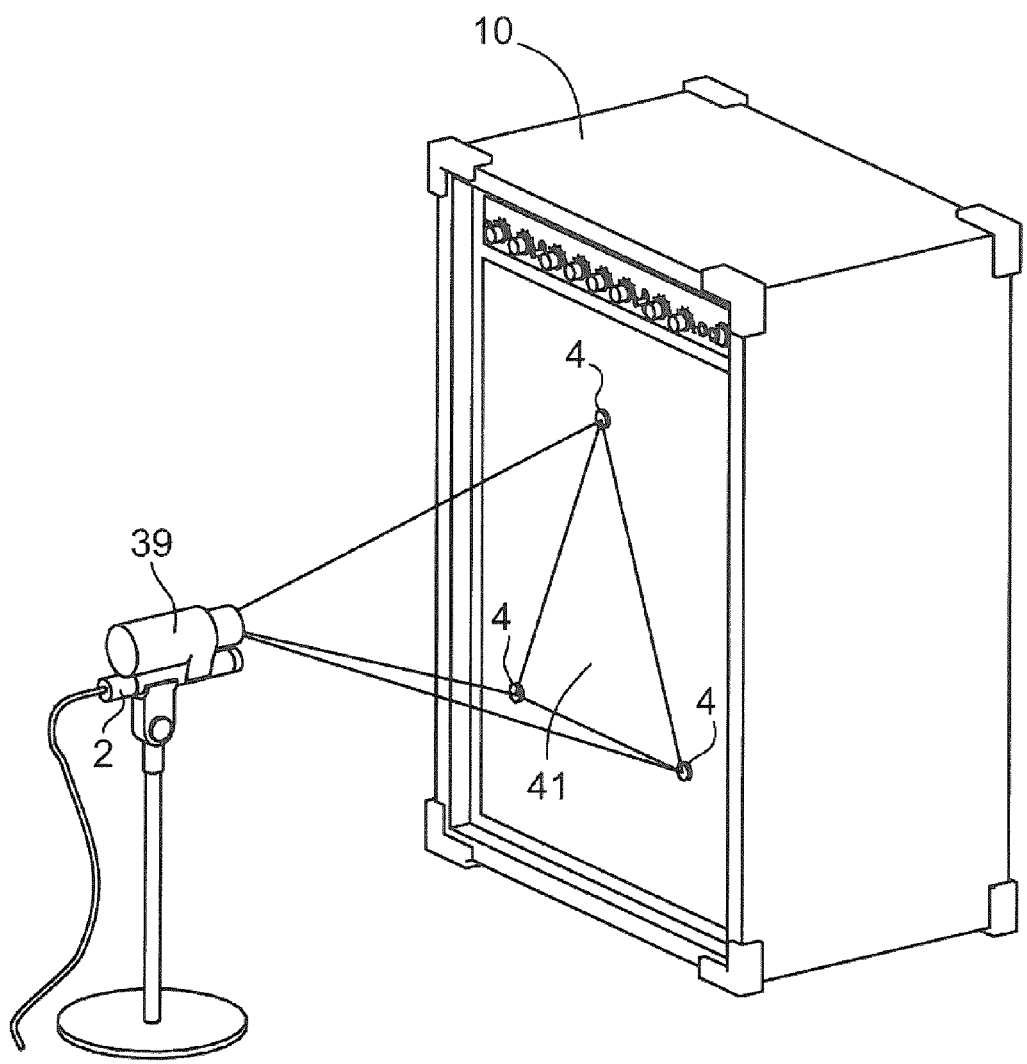
FIG. 21 is a perspective view similar to that shown in FIG. 13 but showing a two dimensional image projected onto the second object.

Shown in FIG. 21 is an alternative embodiment of the relocating device such that the module 39 casts a two dimensional image 41. The module 39 has been employed to locate a microphone 2 in front of an amplifier and loud speaker combination unit 10 by casting its image 41 onto the amplifier. Three locators 4 have been applied to the amplifier and loud speaker combination unit 10 at parts of the cast image 41 that lend themselves to be used at points for applying the locators 4. The cast image 41 may be a logo, a grid pattern or any other image.

Since locators are either applied or selected for each placed object and that one locator is applied for each cast beam of light that is used to locate the object, then it means that the locators have been assigned to the placement of a specific object. Since the locator has been assigned to a specific object and to a specific cast beam of light, then the data as to which locator goes with which cast beam of light and to which placed object must be recorded and maintained for future use. It might be possible to apply a few locators to corresponding surfaces to establish the placement of a single object and no record keeping would have to be kept. But when many objects are to be placed and each employs three beams of light, there will be cases where very many locators will be in use per the specific set up. In this case it would be advantageous to use a notebook, chart or log book to manage the inventory of applied locators and their corresponding data. Additionally, if it is determined that there is more than one accepted placement of an object, for example if a microphone produces good results from either of two locations, and if both locations are to be marked with locators, then the log book of data will need to keep track of the legacy of established placements for the inventory of objects. When several objects are located this way, and when each may use up to three locators, it quickly shows that an electronic data storage method would be useful.

Further relating to the locators used with the relocating device, since the number of locators may become numerous, it may be the case that the actual locator may be an "X" or other identifier applied using a marker that makes an image visible only under improved lighting, such as ultraviolet light. Further it may be a sticker or other identifier that similarly is only visible under ultraviolet light. Using the invisible markings, no locator mark would be visible under ordinary conditions; only with the intentional use of ultraviolet light would the locators be visible.

Figure 22:
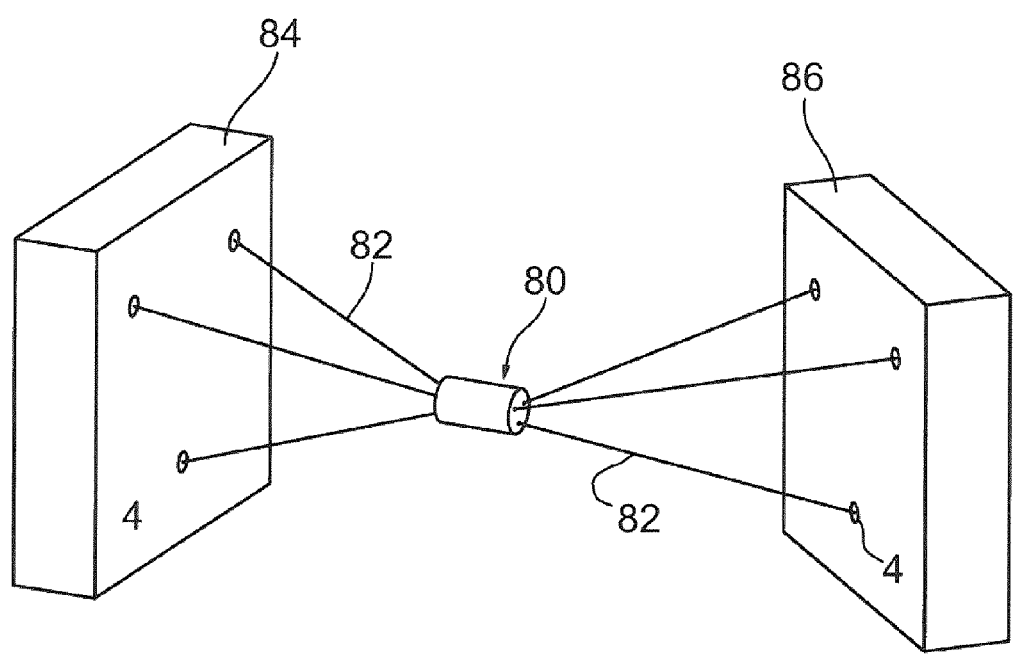
FIG. 22 is a perspective view of an alternate embodiment of a relocating device having beams of light emitted from both ends thereof.

Referring to FIG. 22, an alternate embodiment of the relocating device is shown generally at 80. Relocating device 80 or tandem module has a plurality of beams of light 82 emitted from both ends thereof. Relocating device 80 is positioned between first 84 and second 86 objects and the two objects may be relocated relative to each other. Just as a relocating device 8 may be located with respect to an existing object by placing the relocating device on the object and locating it relative to a second object, two objects could be positioned relative to each other without attaching the relocating device to one of the objects as shown in FIG. 22. In use the relocating device is located relative to the first object 84 and second object 86 and locators 4 are applied to the objects 84, 86. The objects may then be moved and to relocate them relative to each other. The relocating device 80 is repositioned such that the beams of light 82 intersect the locators 4 on one object 84 and then on the other object 86. Thus the objects are repositioned relative to each other.

Figure 23:
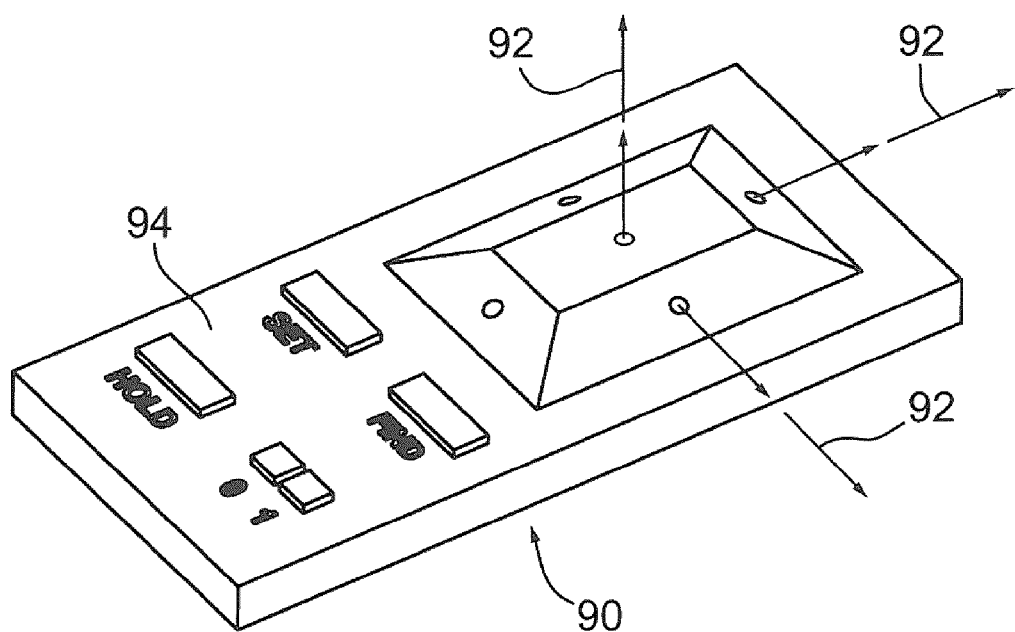
FIG. 23 is a perspective view of an alternate embodiment of a relocating device wherein the device includes a plurality of distance measuring lasers.

Referring to FIG. 23 an alternative embodiment of the relocating device is shown at 90. Relocating device 90 has three lasers 92 that project generally at right angles from each other. The relocating device 90 and lasers 92 are capable of determining the distance from the device 90 to the objects (not shown) that the three lasers 92 point at. More specifically each laser 92 is a laser measuring device such that the device is capable of measuring the distance for each laser in the device or the first object to the second object which will be the first obstacle in its path. Thus the distance measurements are used to define an address. In addition, the device 90 has an internal compass capable of establishing a direction (yaw) with respect to the earth as well as internal means for establishing the tilt of the device 90 in two directions, namely pitch and roll. For example a gyroscope may be included to determine the pitch and roll of the device. As well, an accelerometer may be used to determine the orientation of the device 90. Thus the location of the device in a room may be determined and the placement or location data stored. Shown on the device 90 are a plurality of keys 94 for turning the device 90 on and off as well as for initiating the necessary operating modes like storing a set of placement data for a specific position and confirming the placement data when repositioning the device into a previously stored placement position. Further, the locating device 90 may be releasably attached to a variety of objects as described above with regard to other embodiments.

Figure 24:
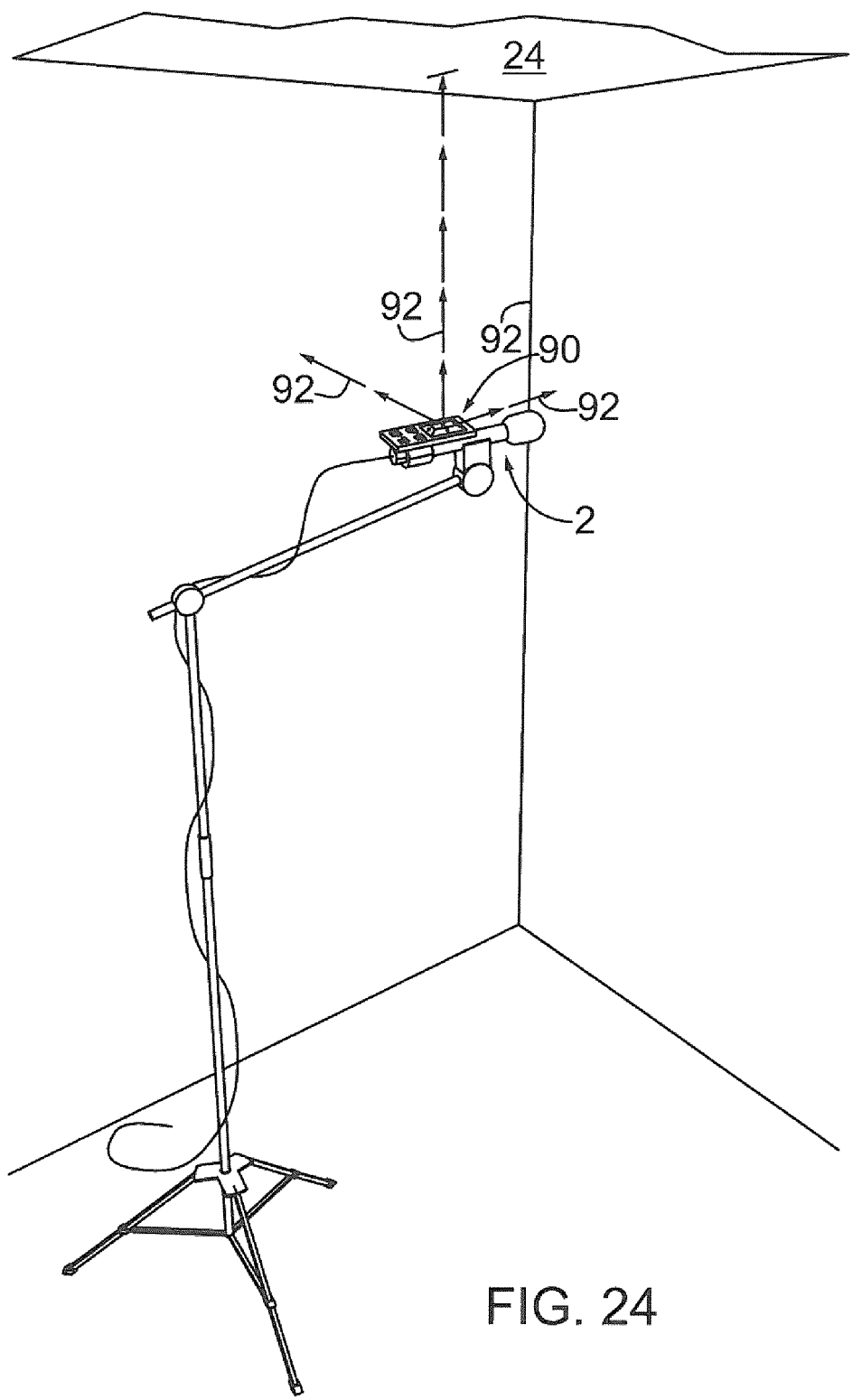
FIG. 24 is a perspective view of the relocating device of FIG. 23 attached to a microphone.

Referring to FIG. 24, locating device 90 is attached to a microphone 2, where the device 90 and energized lasers 92 determine the distance of the device 90 from the ceiling and two walls of a studio 24. Internally, by means of its compass and gyroscope, the device 90 can determine the yaw, pitch and roll orientations of the device 90. The device 90 includes a storage device and the laser measuring devices, are operably connected to the storage device. As well when present the compass, gyroscope and accelerometer are also operably connected to the storage device. Thus the locating device 90 has the capability of storing the data related to that particular placement and once the details relating the microphone 2 has been entered, the device will store all critical data for the placement of that microphone 2 in that studio 24. Further, the device 90 may also store additional data relating to that particular placement like the date, the user's name, the file names of any recordings made along with any remarks the user may add. Note that the data may be stored internally on the storage device in the relocating device or it may be stored in an external storage device such as a smartphone, tablet or computer. Further, note that the data may be stored in a central mixing console in the recording studio.

Figure 25:
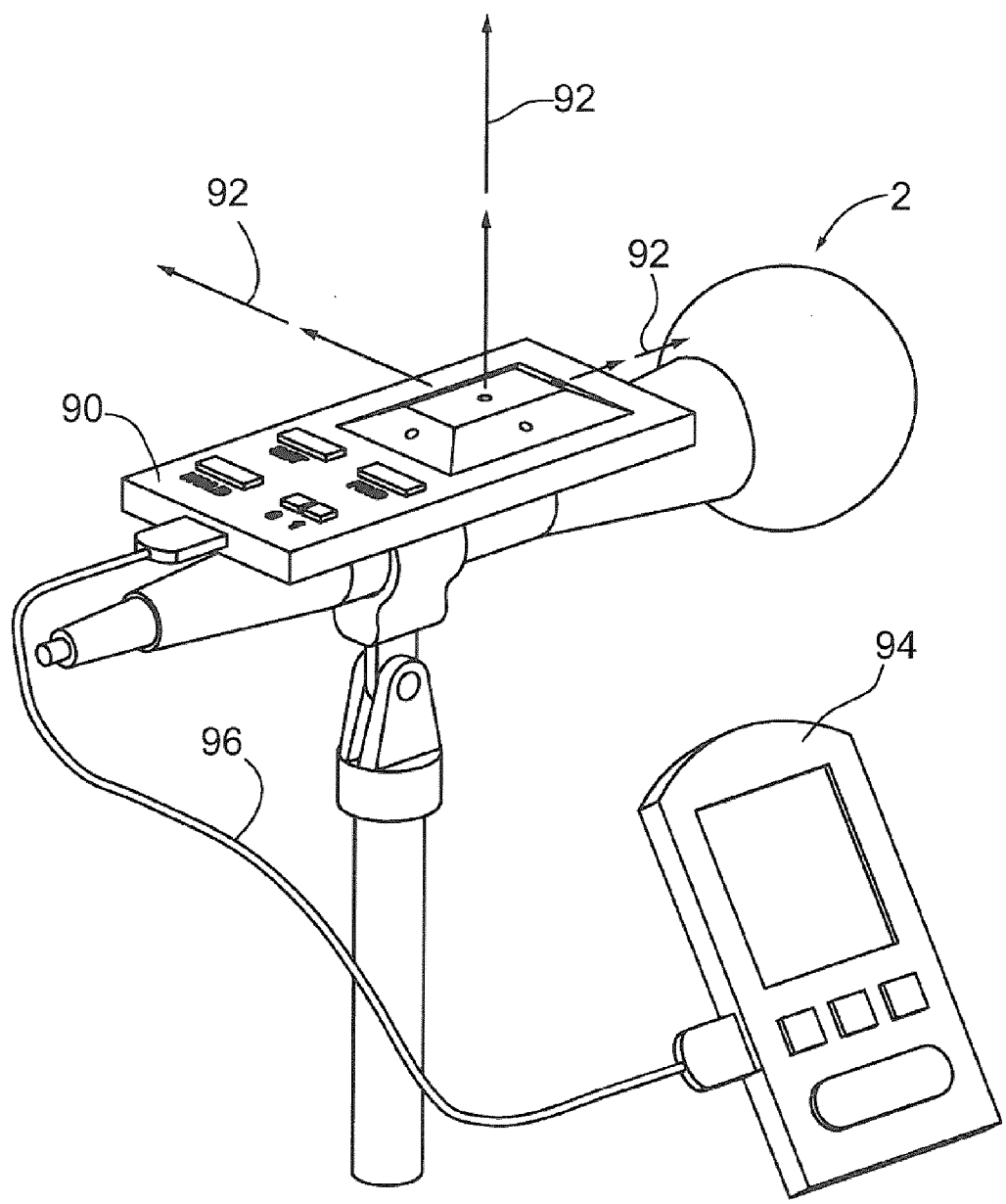
FIG. 25 is a perspective view of the relocating device of FIGS. 23 and 24 and showing it connected to a data storage by way of a cable.

FIG. 25 shows the initial phase or step wherein the placement data for a particular location of the relocating device 90 is obtained. In use the locating device 90 is releasably attached to a microphone 2, where the device 90 and energized lasers 92 can determine the placement of the microphone 2 for that particular placement. The data comprising the details relating to the placement of that microphone 2 may be downloaded via a cable 96 to an existing data storage device 94, like a smart phone or other communication device running a suitable application. Thus locating device 90 may be used to set up a variety of different instruments and a plurality of different microphones in a studio as shown in FIG. 7. The placement data could then be loaded into a storage device included in the relocating device 90 and/or loaded into an external storage device such as a smart phone, handheld computer, tablet or the like. An appropriate application could then store in a separate file all the information related to a particular studio set up.

Figure 26:
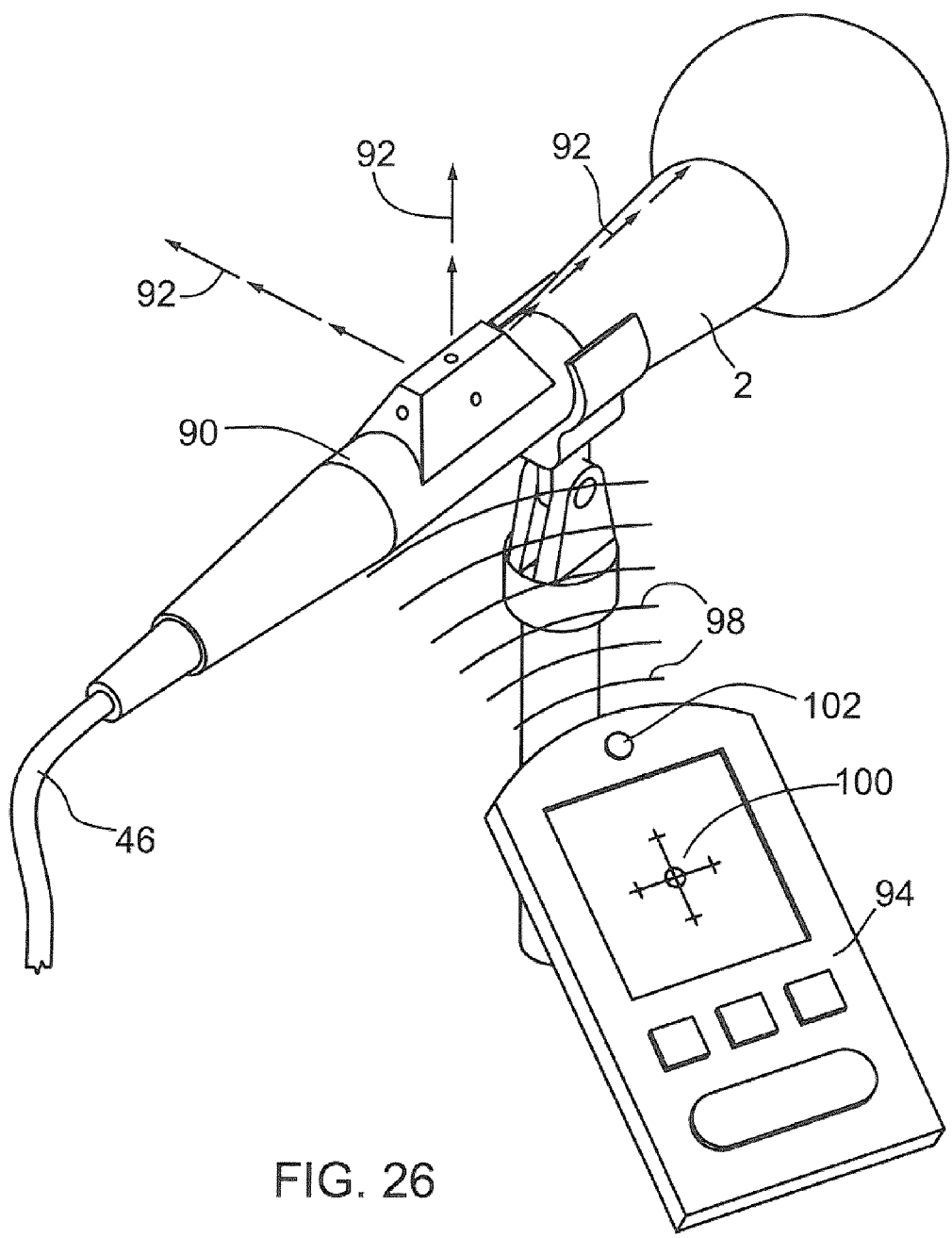
FIG. 26 is a perspective view of an alternate embodiment of a relocating device wherein the device includes a plurality of distance measuring lasers and the device is attached between a microphone and a microphone cable and the device is capable of wirelessly connected to a data storage device.

FIG. 26 shows a relocation device 90, adapted to fit between a microphone 2 and the microphone cable 46. Relocating device 90 is used to place and then subsequently confirm the replacement of the microphone 2 in a previously determined placement or location. In this case, the data relating to that particular placement may be wirelessly 98 transferred between an existing data storage device 94 and the device 90. The lasers 92, internal compass and internal gyroscope may be energized and the placement of the device 90 has been sought to match the original placement. By way of visual 100 and/or audible 102 means or signal, the device 90 notifies the operator when the correct placement of the device 90 (and so the microphone 2 or object or device to which device 90 is attached) has been achieved.

In use the embodiment disclosed in FIGS. 23 to 26 are used in a similar manner to those described previously. More specifically the relocating device 90 is equipped with lasers capable of determining the distance from the device to objects surrounding the device, equipped with a compass for determining its orientation (yaw) with respect to the earth's magnetic field and a gyroscope capable of determining its amount of tilt in two directions commonly called pitch and roll. The first object will be deemed to be in the correct configuration and the placement of that object will be determined with respect to other objects surrounding the first object by applying the relocating device to the first object, by energizing the three lasers, by determining the distance from the device to the three objects that the lasers point at, by determining the direction of the compass (the yaw) and by determining the pitch and roll of the device. Once the three distances and the three rotational aspects of the device are established, the placement of the first object has been established. Data composed of the three distances, the yaw, pitch and roll, as well as any data entered relating specifically to the first object will then be stored in the device. Alternatively, the data may be downloaded from the relocating device to an independent data storage device. Where the data is collected in an independent device from the relocating device, communication of data between the devices may be by means of a wired connection, not excluding the shield line of the microphone cable or a wireless connection like Bluetooth or other wireless standard. In one embodiment, the pitch, roll, yaw and laser measured distance data is collected, processed and stored in the relocating device (the module) and in another embodiment, the data is processed and stored in an independent wired or wireless device.

In use relocating device 90 is then used in the second phase or step wherein the relocating device 90 is then repositioned thus confirming the correct location of the object. In use, relocating device 90 will be applied to or releasably attached or integrally formed with the first object, its lasers, compass and gyroscope will be activated and the placement of the device will be adjusted until all of the laser distances, the yaw, pitch and roll have been established as matching the settings from the initial phase, in which case the object has been successfully relocated. When relocating an object against the data acquired during the initial locating or placement phase or step of this method, the device may employ any number of visual or audible indicators to confirm the exact time the object is returned to the exact location. In the case of visual indicators, it may be an analogue meter, light bar meter, digital LCD meter, resolution of shape, resolution of colour or changing numerical value representation resolving to a predefined value that represents the exact time the object is returned to the exact location. In the case of audio indicators, it may be a changing sound not excluding language or voice, pitch or sound intensity that resolves at a predefined sound, pitch or sound intensity that represents the exact time the object is returned to the exact location. Generally speaking, the systems described herein are directed to a relocating device and method of use thereof. As required, embodiments of the relocating device and methods of use are disclosed herein. However, the disclosed embodiments are merely exemplary, and it should be understood that the relocating device may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the relocating device. For purposes of teaching and not limitation, the illustrated embodiments are directed to a relocating device and method of use thereof.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

As used herein, the phrase "operably connected to" use wherein object A is operably connected to object B means that the object A is connected to object B either directly or wherein one or more objects are connected therebetween.

What is claimed is:

1. A relocating device for locating and relocating a first object relative to a second object, for use in association with a means for defining a location point on the second object, such that the first object may be moved and then relocated relative to the second object comprising:
    at least one light source for producing at least three beams of light wherein each beam of light is capable of defining a beam location point in relation to the second object, and each beam of light emanates in a different direction, the at least one light source is operably connected to the first object;
    a power source operably connected to the at least one light source; and
    the means for defining a location point on the second object defines each beam location point in relation to the second object.

2. The relocating device as claimed in claim 1 wherein the means for defining a beam location point on the second object is one of a marker, an adhesive locator, an adhesive locator with an alignment symbol thereon and an adhesive locator with an alignment symbol and a bar code.

3. The relocating device as claimed in claim 1 wherein the at least one light source is a plurality of light sources, each light source being a laser beam and each laser beam defining a beam location point.

4. The relocating device as claimed in claim 3 wherein each laser beam is a laser measuring device that measures the distance from the first object to the second object and thus defines the beam location point on the second object.

5. The relocating device as claimed in claim 4 wherein the distance measurements define an address and the address is used to define the beam location points in relation to the second object.

6. The relocating device as claimed in claim 1 further including a means for defining a yaw of the relocating device and the yaw is further used to define an address.

7. The relocating device as claimed in claim 6 wherein means for defining the yaw is a compass.

8. The relocating device as claimed in claim 1 further including a means for defining the pitch and roll of the relocating device and the pitch and roll are further used to define an address.

9. The relocating device as claimed in claim 8 wherein the means for defining the pitch and roll is a gyroscope.

10. The relocating device as claimed in claim 1 wherein the relocating device is an irregular tetrahedral shape having four faces and each beam of light emanates from a different face.

11. The relocating device as claimed in claim 1 further includes a mount and the mount is attached to the first object and the relocating device is releasably attached to the mount and the mount has a plurality of mounting positions.

12. The relocating device as claimed in claim 1 wherein data relating to each beam location point is stored in a storage device in one of the relocating device, an external storage device or both.

13. The relocating device as claimed in claim 12 wherein further data is also stored and the further data includes one of date, song, group, recording session, instruments, amplifiers, microphones and a combination thereof.

14. A method of locating and relocating a first object relative to a second object comprising the steps of:
    locating a first object relative to a second object to define a set location, the first object being positioned relative to a relocating device, the relocating device having at least one light source for producing at least three beams of light each of which emanates in a different direction wherein each beam of light is capable of defining a beam location point in relation to the second object, a power source operably connected to the at least one light source, and a means for defining a beam location point;
    defining the location points relative to the second object with respect to each beam location point;
    moving at least one of the first object and the second object; and
    moving one of the first object relative to the second object so that each beam location point is in registration with the beam location point.

15. The method as claimed in claim 14 wherein data relating to each beam location point is stored in a storage device in one of the relocating device, an external storage device or both and further including the step of logging the data.

16. The method as claimed in claim 15 wherein further data is also stored and the further data includes one of date, song, group, recording session, instruments, amplifiers, microphones and a combination thereof.

17. A method of locating and relocating a first object relative to a second object comprising the steps of:
  locating a first object relative to a second object to define a set location, the first object being positioned relative to at least one light source;
  directing at least three beams of light from the light source onto the second object, wherein each beam of light emanates in a different direction and is capable of defining a beam location point in relation to the second object;
  defining the beam location points relative to the second object with respect to each beam of light;
  moving at least one of the first object and the second object; and
  relocating the first object relative to the second object the relocating including repeating the step of directing the at least three beams of light, each beam of light emanating in a different direction and capable of defining a beam location point in relation to the second object, so that each beam location point defined in the relocating step is in registration with the previously defined beam location point.

* * * * *